United States Patent
Baron et al.

(10) Patent No.: US 7,894,364 B2
(45) Date of Patent: Feb. 22, 2011

(54) METHOD FOR THE TRANSMISSION OF DATA PACKETS IN A TUNNEL, CORRESPONDING COMPUTER PROGRAM PRODUCT, STORAGE MEANS AND TUNNEL END-POINT

(75) Inventors: Stéphane Baron, Le Rheu (FR); Pascal Rousseau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 12/176,966

(22) Filed: Jul. 21, 2008

(65) Prior Publication Data
US 2009/0034416 A1    Feb. 5, 2009

(30) Foreign Application Priority Data
Jul. 30, 2007    (FR)    ................................... 07 56817

(51) Int. Cl.
*G06F 11/00*    (2006.01)
(52) U.S. Cl. .................................................. 370/252
(58) Field of Classification Search ......... 370/465–467, 370/401, 332, 237, 349, 474, 241–253, 254; 709/203; 726/14, 15
See application file for complete search history.

(56) References Cited

U.S. PATENT DOCUMENTS

| | | | | |
|---|---|---|---|---|
| 2001/0030944 | A1* | 10/2001 | Kato ........................... | 370/237 |
| 2003/0048750 | A1* | 3/2003 | Kobayashi ................... | 370/229 |
| 2003/0058277 | A1* | 3/2003 | Bowman-Amuah ......... | 345/765 |
| 2007/0094723 | A1* | 4/2007 | Short et al. .................. | 726/14 |
| 2007/0223443 | A1* | 9/2007 | Wang et al. .................. | 370/349 |
| 2008/0005275 | A1* | 1/2008 | Overton et al. .............. | 709/218 |
| 2008/0056302 | A1* | 3/2008 | Erdal et al. .................. | 370/474 |
| 2008/0205345 | A1* | 8/2008 | Sachs et al. .................. | 370/332 |
| 2009/0097424 | A1* | 4/2009 | Greiner et al. .............. | 370/310 |

OTHER PUBLICATIONS

S. Khanvilkar, et al., "Flexi-Tunes: An efficent architecture for adaptive and flexible VPN tunnels", Tech. Report for MSL, Online 2004. URL:http://mia.ece.uic.edu/{papers/publications/>.
I. Cidon, et al., "Hybrid TCP-UDP transport for Web traffic", Performance, Computing And Communications Conference, 1999 IEEE International, Scottsdale, AZ, Feb. 10-12, 1999, pp. 177-184.
French Search Report dated Mar. 10, 2008, issued during prosecution of related French application No. 07/56817.

* cited by examiner

*Primary Examiner*—Kwang B Yao
*Assistant Examiner*—Kenan Cehic
(74) *Attorney, Agent, or Firm*—Fitzpatrick, Cella, Harper & Scinto

(57) ABSTRACT

In a tunnel incoming end-point, for each data packet, the data packet coming from a source device belonging to a same sub-network as the tunnel incoming end-point is received. An effective channel from among the transmission channels is selected, as a function of a protocol associated with the payload data contained in the received packet, and of a piece of information on quality of transport linked to current conditions of transmission on the transmission channels, the piece of information depending on the protocol associated with the payload data contained in the received packet. The received packet is then encapsulated, according to a transport protocol associated with the effective channel, used to obtain a packet to be sent, and the packet to be sent in the tunnel are transmitted on the effective channel selected.

17 Claims, 15 Drawing Sheets

| Type | Mode of transport | Wtcp | Stcp | Wtcp_max | Wudp | Sudp | Wudp_max |
|---|---|---|---|---|---|---|---|
| Type1 | UDP | 0 | 0 | 0 | 120000 | 120000 | 120000 |
| Type2 | UDP_to_TCP | 1500 | 300 | 10000 | 10000 | 0 | 10000 |
| ... | | | | | | | |

Fig. 7b

METHOD FOR THE TRANSMISSION OF DATA PACKETS IN A TUNNEL, CORRESPONDING COMPUTER PROGRAM PRODUCT, STORAGE MEANS AND TUNNEL END-POINT

FIELD OF THE DISCLOSURE

The field of the disclosure is that of communications networks.

More specifically, the disclosure relates to a technique for the transmission of data packets (also called datagrams) in a tunnel going through a communications network.

The democratization of high-bit-rate Internet on the one hand and the appearance of widespread consumer audiovisual equipment having network connectivity on the other hand is going to create new forms of behavior on the part of users. These new forms of behavior will undoubtedly involve the appearance of individuals belonging to groups of persons having common interests (leisure, family, etc) that we might call "permanently linked" groups. These groups will set up almost permanent connections with other individuals of a same field of interest, setting up audio and/or video communications and sharing all kinds of information (audio, video, photo, text etc).

The technology of Virtual Private Networks (VPN) is offering a worthwhile solution to this expectation. VPN enables real-time transparent communication in a secure way between individuals who share a same field of interest while at the same time using the Internet infrastructure which has low reliability but is inexpensive.

To communicate transparently and overcome the need for non-routable addresses, VPNs use a particular type of encapsulation known as tunnelling which creates what is called a tunnel. This operation consists in encapsulating an A-level protocol (an passenger protocol) in a B-level protocol (transport protocol) by means of an encapsulation protocol C, B being a protocol of a layer (level) higher than or equal to that of A in a layered model such as the ISO model which describes the services offered by each of these layers and their interactions.

Thus, the transport protocol processes the passenger protocol as if it were payload data. FIG. 1b, described in detail here below, presents an example of a VPN of level 2, i.e., of encapsulation in a level-2 tunnel (a level-2 tunnel means that the passenger protocol is a protocol of the layer 2 of the ISO model).

Tunnelling may be used to transport a network protocol on a network that does not support it. It can also be used to provide different types of VPN functions such as for example private addressing.

Tunnelling techniques are now increasingly used by customer functions entailing remote access and by home local area networks (LANs).

Here below in the description, we consider, by way of an example, solely level 2 or level 3 tunnels for which the level of the transport layer is higher than or equal to 4 (i.e. at least that of the transport layer in the ISO model).

VPNs are frequently used to interconnect two LANs in order to create a virtual local area network formed by the union of two original LANs. Secured VPNs include a cryptography and authentication algorithm to guarantee the secrecy of the transported data. A typical VPN configuration based on a tunnelling technique is illustrated in FIG. 1a (described in detail here below). In this example, the tunnel end-points are not integrated into the gateways. The tunnel is set up between two tunnel end-points and each packet (also called a frame) sent to an apparatus connected to the remote LAN is encapsulated by the local tunnel end-point and then sent to the remote tunnel end-point which will de-encapsulate it and send it on the remote LAN. For the apparatuses, they are virtually connected to a same LAN. Communication between two apparatuses through the tunnel is called end-to-end communication.

BACKGROUND OF THE DISCLOSURE

One of the first questions that arise where deciding to set up a tunnel between two tunnel end-points is that of knowing which should be the transport protocol of this tunnel.

In the prior art, it is chiefly the layer 3 IP (Internet protocol) or the layer 4 TCP/UDP (transmission control protocol/user datagram protocol) that is used. Since IP-based tunnelling technologies cannot take account of the network address translation (NAT) mechanism and since they are not entirely compatible with the typical tunnelling configuration of FIG. 1, in the rest of the description here below, we consider (by way of examples only) solutions based on layer 4 (transport layer) i.e. on the TCP or the UDP.

The TCP protocol is a connection-oriented reliable protocol giving the sender the guarantee that his or her data will be effectively received (management of acknowledgement) and that all the frames are received in a given order. The TCP applies an efficient congestion control mechanism.

The UDP protocol is a far simpler and faster protocol that does not take account of the order of the frames and does not manage acknowledgement.

In this particular case (referred to solely by way of an example), the above-mentioned question becomes one of knowing whether the TCP or UDP protocol should be used as a transport protocol for the tunnel?

The problem is that the protocol corresponding to the data used in the passenger protocol may interfere with the mechanisms implemented in the transport protocol in the tunnel. For example, if we look at the TCP as a transport protocol and the TCP as a protocol corresponding to the payload data of the passenger protocol (the combination known as TCP over TCP), we are confronted with destructive interactions between the two TCP congestion control mechanisms. For further details, reference may be made especially to "Understanding TCP over TCP: effects of TCP tunnelling on end-to-end throughput and latency (O Honda, H Ohsaki, M. Imase, M. Ishizuka, J. Murayama). (Proceedings of the SPIE, volume 6011, pp 138-146 (October 2005)".

A first response may be to say that the TCP over TCP combination is not a good solution. However, even if, in certain conditions, it is well known that this type of tunnelling downgrades end-to-end performance, under other conditions the same combination improves end-to-end performance (see for example the above-mentioned document as well as the following document: "Avoiding congestion collapse on the Internet using TCP tunnels (B. P. Lee, R. K. Balan, L. Jacob, W. K. G Seah, A. L Ananda) (Computer Networks 39 (2002) pages 207-219, December 2002)". The same problem arises with the "UDP over UDP" combination, i.e. when we look at the UDP protocol as the transport protocol and the UDP protocol as the passenger protocol.

There is therefore no absolute response to the above-mentioned question (namely which is the transport protocol to be used in the tunnel) because this depends essentially on three factors:

the type of data to be transmitted through the tunnel (protocol corresponding to the payload data of the passenger protocol, type of application (transfer of files, audio and/or video streaming etc);

the quality of the network (in terms of frame loss or corruption, congestion etc) between the two tunnel end-points; and the user's and/or administrator's preferences (in terms of bandwidth, reliability, jitter etc).

At present, when it is decided to set up a tunnel between two tunnel end-points, it is imperatively necessary to make a predetermined choice for the transport protocol (i.e. a predetermined choice of channel in the tunnel, should each channel use a distinct transport protocol) although this choice is not optimal in all situations.

There is a known technique, described in the US patent document No. 6614800 that uses two virtual private networks (VPNs), i.e. two tunnels: the first tunnel (between two IP addresses) for control data, the second panel (between two other IP addresses) for the payload data. This technique enables the choice of a first transport protocol for the control data and a second transport protocol for the payload data, the two types of data going through two distinct tunnels. The choice of the transport protocol may therefore be optimized on each of the two channels.

This technique however has two major drawbacks: it calls for two tunnels (two pairs of IP addresses) and each type of data (control data and payload data) always uses the same transport protocol. For a type of data considered, the choice is therefore not optimum in every situation (we shall return to the discussion here below).

AIMS OF THE DISCLOSURE

The disclosure, in at least one embodiment, is aimed especially at overcoming the different drawbacks of the prior art.

More specifically, in at least one embodiment of the disclosure, it is a goal to provide a technique of data packet transmission in a tunnel by which the choice of the transport channel can be optimized.

It is another goal, in at least one embodiment of the disclosure, to avert abrupt changes in the quantity of data to be transmitted on a channel of the tunnel, which would result in causing deterioration of the transmission on this channel.

At least one embodiment of the of the disclosure is also aimed at providing a technique of this kind that is simple to implement and costs little.

Yet another goal of at least one embodiment of the disclosure is to provide a technique of this kind that can be implemented in tunnel end-points and is therefore transparent for source and destination equipment.

SUMMARY

In a particular embodiment of the disclosure, a method is proposed for the transmission of data packets in a tunnel interconnecting two sub-networks in order to form a total communications network, said tunnel being implemented between two tunnel end-points, each of said sub-networks comprising a distinct tunnel end-point among said tunnel end-points, said tunnel implementing at least two transmission channels, said method being implemented by one of said tunnel end-points, known as a tunnel incoming end-point. The method comprises the following steps for each data packet:

a) reception of said data packet coming from a source device belonging to a same sub-network as the tunnel incoming end-point;

b) selection of an effective channel from among the transmission channels, as a function of a protocol associated with the payload data contained in said received packet, and of a piece of information on quality of transport linked to current transmission conditions in said transmission channels;

c) encapsulation of said received packet, according to a transport protocol associated with the effective channel, used to obtain a packet to be sent; and d) transmission of the packet to be sent in the tunnel on the effective channel selected.

The general principle of the invention therefore consists in performing a dynamic multi-channel tunnelling, i.e. using a multi-channel tunnel (each channel being defined for example by its transport protocol and, possibly, by a pair of input/output ports) and selecting one of the channels of the tunnel for each data packet to be transmitted on the tunnel.

In this way, the effective channel (and therefore the transport protocol) used is always optimal.

It must be noted that the step of selection of the effective transmission channel is based both on the type of data packet coming from the source (i.e. the protocol of the payload data contained in this packet) and return information on the quality of the transmission on the network.

Advantageously, said information on quality of transport related to current conditions of transmission belongs to the group comprising:

information on congestion of said transmission channels (ECN);

information on a packet error rate (PER) for said transmission channels; and information on a retransmission rate of said transmission channels (TCP channel retransmission rate).

The criteria of selection of the channels may be based on one or more combined elements of this list. This list is not exhaustive.

For information on network congestion, we use for example the ECN (Explicit Congestion Notification) as described especially in "RFC 3168—The Addition of Explicit Congestion Notification (ECN) to IP".

The packet error rate is also known as the PER.

Advantageously, said step b) of selection of an effective channel comprises the following steps:

i) determining a type of packet associated with said received packet, each type of packet being defined by a distinct protocol associated with the payload data contained in the packets possessing said type of packet;

ii) determining a preferred channel called a preceding preferred channel enabling, for a previously transmitted packet transmitted by the tunnel incoming end-point and being of a type identical to said received packet, an optimum transmission as a function of a piece of information on quality of transport related to transmission conditions on said transmission channels obtained for said previously transmitted packet;

iii) obtaining said information on quality of transport linked to current conditions of transmission on said transmission channels;

iv) selecting a channel, called a new preferred channel, enabling optimum transmission of said received packet as a function of the type of packet associated with the received packet and of said at least one piece of information on quality of transport linked to current conditions of transmission; and v) selecting said effective channel as a function of the preceding preferred channel, the new preferred channel and the type of packet associated with said received packet.

It is important that the effective transmission channel may momentarily be different from the new preferred channel (for example in the case of the change in preferred channel following a modification of the conditions of transmission on the network).

For example, if the received packet is an IP datagram, the term "protocol associated with the payload data contained in a packet" is understood to mean the transport layer (level) protocol of the ISO model (such as TCP or UDP) associated with the payload data of this IP datagram. This ISO model transport layer (or level) protocol associated with the payload data should not be mistaken for the transport protocol associated with each transmission channel of the tunnel.

According to an advantageous characteristic if, for the type of data associated with said received packet, the preceding preferred channel is different from the new preferred channel, then the selection of the effective channel results from a mechanism of smooth switching from said preceding preferred channel to said new preferred channel for the type of packet associated with said received packet.

The mechanism of smooth switching prevents sudden variations in the quantity of data to be transmitted on the channel, which would result in a deterioration of transmission.

For example, during a switching from a UDP channel to a TCP channel (i.e. from a channel whose transport protocol is the TCP protocol to a channel whose transport protocol is the UDP protocol), if all the packets on the TCP channel are immediately switched over without taking care to comply with the TCP (congestion) window of the TCP channel, the packets that cannot be immediately transmitted will be delayed (or buffered) creating an artificial increase in the RTT (round trip time) for these packets, the result of which could entail even a retransmission of certain packets which would have catastrophic effects should the passenger protocol be the TCP protocol. Clearly, all the expected benefits of a switching from the UDP channel to the TCP channel would be lost and all that would be done would be to worsen matters by introducing artificial disturbances.

Similarly, a switching from a TCP channel to a UDP channel without control could clog the transmission medium because it must not be forgotten that the different transmission channels share the same physical access to the Internet. In the case of a change from a TCP channel to a UDP channel, packets buffered on the TCP channel and designed to be sent on the TCP channel would be highly penalized by a rapid increase in the throughput on the UDP channel. It is therefore necessary to set up a gradual system for the transfer of the use of the bandwidth by the TCP channel to the UDP channel. With such a system, the packets buffered on the TCP channel have the time to be made to flow so much so that when the totality of the packets are transmitted on the new channel (UDP channel), no packet will have been penalized.

Advantageously, said smooth switching mechanism comprises, for each type of packet, a step of management of a maximum transmission window for each of said channels, indicating a maximum quantity of data that can be transmitted on said channel during a given time interval.

Thus, each transmission channel of the tunnel has a transmission window to define the maximum quantity of data that can be transmitted on this channel by the tunnel end-point during a given time interval.

According to an advantageous characteristic, after expiry of the given time interval, the maximum transmission window of the new preferred channel is increased and the maximum transmission window of the preceding preferred channel is diminished, indicating a new maximum quantity of data that can be transmitted on said channels during a new given time interval.

Thus, this ensures that the maximum quantity of data that can be transmitted on the transmission channels changes over time so as to commonly ensure the smooth switching from one channel (previously preferred channel) to the other (new preferred channel).

According to a preferred characteristic, the effective channel is:
the new preferred channel within the limits of the transmission window associated with said new preferred channel for the type of packet associated with the received packet, or
the previous preferred channel, in the event of an exceeding of said transmission window associated with said new preferred channel for the type of packet associated with the received packet.

Advantageously, each channel is identified uniquely by the transport protocol that is associated with it.

We have, for example, a TCP channel and a UDP channel identified by the TCP and UDP transport protocols respectively.

In an advantageous variant, each channel is identified uniquely by the transport protocol associated with it and input and output ports of said transport protocol.

Thus, it is possible to manage several channels distinctly using a same transport protocol but, for example, different types of services for packets traveling through each of these channels.

In an exemplary embodiment, said step of selection of an effective channel is done from among the following two channels:
a first channel, called a TCP channel, whose associated transport protocol is the TCP protocol; and
a second channel, called a UDP channel, whose associated transport protocol is the UDP protocol.

In a first particular embodiment, should the received packet be a UDP type packet, if said information on quality of transport linked to current conditions of transmission indicates a congestion of said transmission channels, then the new preferred channel for said received packet is the UDP channel and, if said information on quality of transport linked to current conditions of transmission does not indicate any congestion of said transmission channels, then the new preferred channel for said received packet is the TCP channel.

In a second particular embodiment, should the received packet be a UDP type packet, if said information on quality of transport linked to current conditions of transmission indicates a congestion of said transmission channels, then the new preferred channel of the said received packet is the UDP channel, and if said information on quality of transport linked to current conditions of transmission indicates a packet error rate (PER) below a determined threshold (Pth), then the new preferred channel for said received packet is the TCP channel and if said information on quality of transport linked to current conditions of transmission indicates a packet error rate of said transmission channels (PER) greater than or equal to said determined threshold (Pth), then the new preferred channel for said received packet is the UDP channel.

In a third particular embodiment, should the received packet be a TCP type packet, if said information on quality of transport linked to current transmission conditions indicate a retransmission rate of said transmission channels above a determined threshold (Rth), then the new preferred channel for said received packet is the UDP channel and if said information on quality of transport linked to current conditions of transmission indicate a transmission rate of said transmission channels lower than or equal to said determined threshold (Rth), then the new preferred channel for said received packet is the TCP channel.

It is clear that other embodiments of the step of selection of the new preferred channel can be envisaged without departing from the scope of the present invention. It is possible, for example, to use other criteria of quality of transmission on the network and/or other combinations of the criteria used in the first, second and third embodiments mentioned here above.

In another embodiment, it is proposed a computer program product downloadable from a communications network and/or recorded on a computer-readable carrier and/or executable by a processor, said computer program product comprising program code instructions for the implementation of the above-mentioned method (in at least one of its embodiment), when said program is executed on a computer.

In another embodiment, it is proposed a storage means that is possibly totally or partially detachable, readable by a computer, storing a set of instructions that can be executed by said computer to implement the above-mentioned method (in at least one of its embodiment) when said program is executed on a computer.

In another embodiment, it is proposed a tunnel incoming end-point enabling the transmission of data packets in a tunnel interconnecting two sub-networks in order to form a total communications network, said tunnel being implemented between said tunnel incoming end-point and a tunnel outgoing end-point, each of said sub-networks comprising a distinct tunnel end-point amongst said tunnel end-points, said tunnel implementing at least two transmission channels. The tunnel incoming end-point comprises:
  means of reception of a data packet coming from a source device belonging to a same sub-network as the tunnel incoming end-point;
  means of selection of an effective channel from among the transmission channels, as a function of a protocol associated with the payload data contained in said received packet, and of a piece of information on quality of transport linked to current transmission conditions in said transmission channels;
  means of encapsulation of said received packet, according to a transport protocol associated with the effective channel, used to obtain a packet to be sent; and
  means of transmission of the packet to be sent in the tunnel on the effective channel selected.

Advantageously, said information on quality of transport related to current conditions of transmission belongs to the group comprising:
  information on congestion of said transmission channels;
  information or a packet error rate (PER) for said transmission channels; and
  information on a retransmission rate of said transmission channels.

Advantageously, said means of selection of an effective channel comprise:
  means of determining a type of packet associated with said received packet, each type of packet being defined by a distinct protocol associated with the payload data contained in the packets possessing said type of packet;
  means of determining a preferred channel, called a preceding preferred channel enabling, for a previously transmitted packet transmitted by the tunnel incoming end-point and being of a type identical to said received packet, an optimum transmission as a function of a piece of information on quality of transport related to transmission conditions on said transmission channels obtained for said previously transmitted packet;
  means of obtaining said information on quality of transport linked to current conditions of transmission on said transmission channels;
  means of selecting a channel, called a new preferred channel, enabling optimum transmission of said received packet as a function of the type of packet associated with the received packet and of said at least one piece of information on quality of transport linked to current conditions of transmission; and
  means of selection of said effective channel as a function of the preceding preferred channel, the new preferred channel and the type of packet associated with said received packet.

According to an advantageous characteristic, said means of selection of the effective channel comprise:
  means of implementing a mechanism of smooth switching from said preceding preferred channel to said new preferred channel for the type of packet associated with said received packet; and
  means of activation of said means of implementing a smooth switching mechanism if, for the type of packet associated with said received packet, the previous preferred channel is different from the new preferred channel.

Advantageously, said means of implementing the smooth switching mechanism comprise, for each type of packet, a step of management of a maximum transmission window for each of said channels, indicating a maximum quantity of data that can be transmitted on said channel during a given time interval.

According to an advantageous characteristic, said window management means are such that, after expiry of the given time interval, the maximum transmission window of the new preferred channel is increased and the maximum transmission window of the preceding preferred channel is diminished, indicating a new maximum quantity of data that can be transmitted on said channels during a new given time interval.

According to a preferred characteristic, said means of implementation of the smooth switching mechanism are such that the effective channel is:
  the new preferred channel, within the limits of the transmission window associated with said new preferred channel for the type of packet associated with the received packet, or
  the previous preferred channel, in the event of an exceeding of said transmission window associated with said new preferred channel for the type of packet associated with the received packet.

Advantageously, each channel is identified uniquely by the transport protocol that is associated with it.

According to an advantageous variant, each channel is identified uniquely by the transport protocol associated with it and input and output ports of said transport protocol.

In one exemplary embodiment, said transmission channels among which the selection of the effective channel is made the following two channels:
  a first channel, called a TCP channel, whose associated transport protocol is the TCP protocol; and
  a second channel, called a UDP channel, whose associated transport protocol is the UDP protocol.

In a first particular embodiment, said means of selection of the effective channel are such that, should the received packet be a UDP type packet, if said information on quality of transport linked to current conditions of transmission indicates a congestion of said transmission channels, then the new preferred channel for said received packet is the UDP channel and, if said information on quality of transport linked to current conditions of transmission does not indicate any congestion of said transmission channels, then the new preferred channel for said received packet is the TCP channel.

In a second particular embodiment, said means of selection of the effective channel are such that, should the received packet be a UDP type packet, if said information on quality of transport linked to current conditions of transmission indicates a congestion of said transmission channels, then the new preferred channel of the said received packet is the UDP channel, and if said information on quality of transport linked to current conditions of transmission indicates a packet error rate below a determined threshold, then the new preferred channel for said received packet is the TCP channel and if said information on quality of transport linked to current conditions of transmission indicates a packet error rate of said transmission channels greater than or equal to said determined threshold, then the new preferred channel for said received packet is the UDP channel.

In a third particular embodiment, said means of selection of the effective channel are such that, should the received packet be a TCP type packet, if said information on quality of transport linked to current transmission conditions indicate a retransmission rate of said transmission channels above a determined threshold, then the new preferred channel for said received packet is the UDP channel and if said information on quality of transport linked to current conditions of transmission indicate a transmission rate of said transmission channels lower than or equal to said determined threshold, then the new preferred channel for said received packet is the TCP channel.

BRIEF DESCRIPTION OF THE DRAWINGS

Other features and advantages of embodiments of the invention shall appear from the following description, given by way of an indicative and non-exhaustive example (not all the embodiments of the invention are limited to the features and advantages of the embodiments described here below) and from the appended drawings, of which:

FIG. 7b is a table of the types of packets according to a particular embodiment of the method of the invention;

DETAILED DESCRIPTION OF ILLUSTRATIVE EMBODIMENTS

In all the figures of the present document, the identical elements and steps are designated by a same numerical reference.

The present disclosure therefore relates to a technique implemented in two tunnel end-points, connected to a first and second LAN respectively, in order to improve communications between pieces of equipment connected to the first LAN and pieces of equipment connected to the second LAN.

The general principle of the disclosure consists of the selection, for each data packet to be transmitted via the tunnel, of the best channel (characterized typically by its transport protocol) to be used. The selection is based on the type of data to be transmitted (protocol of the payload data contained in this packet, type of application etc) as well as on conditions of transmission on the network (between the two tunnel end-points).

Figure 1A:
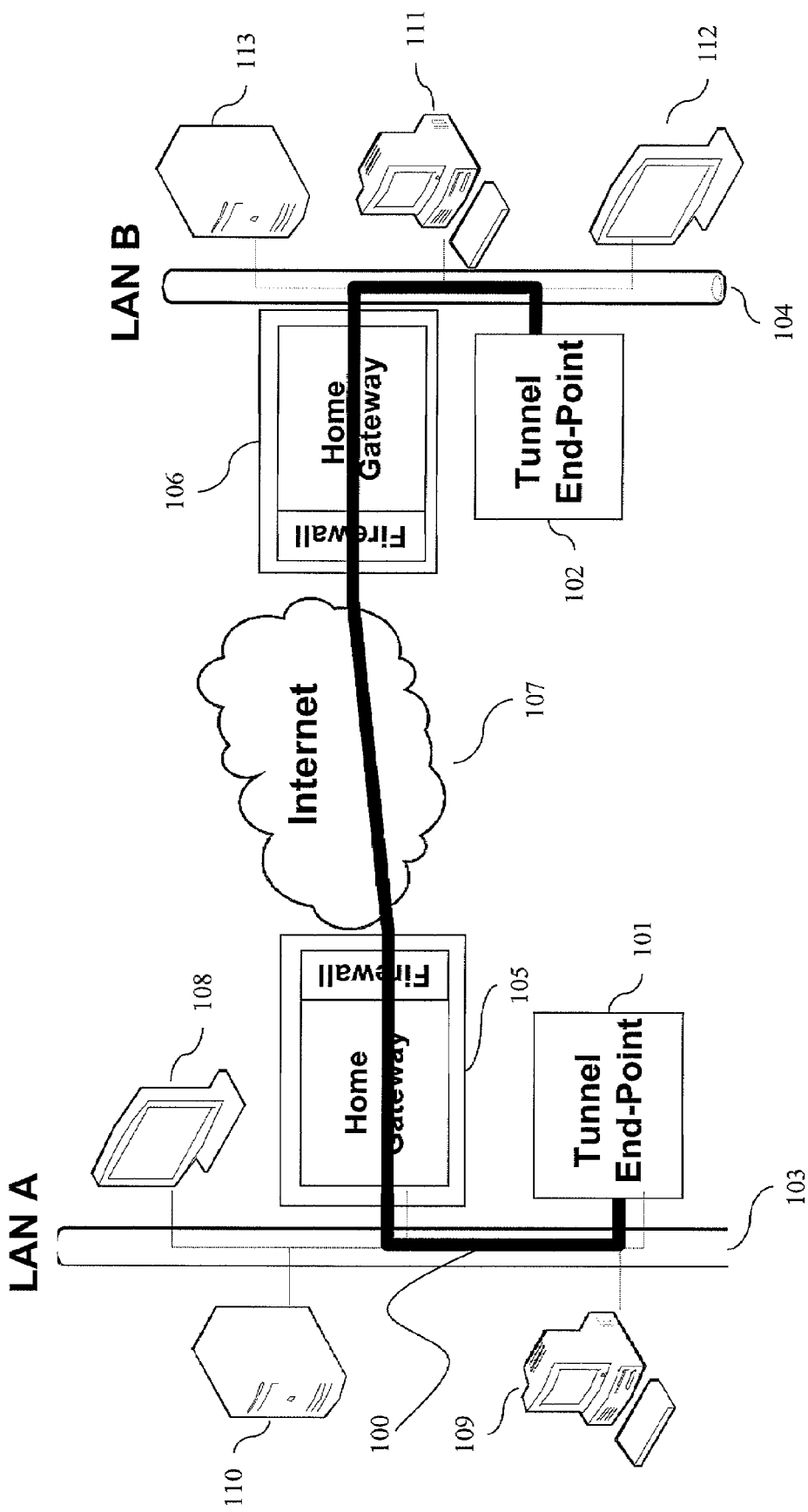
FIG. 1a illustrates a typical virtual private network (VPN) configuration using a tunnel.

FIG. 1a illustrates a typical configuration of a virtual private network (VPN) implementing a tunnel 100 between a local tunnel end-point 101 and a remote tunnel end-point 102, through a communications network 107 (the Internet for example). This tunnel 100 connects two local networks: LAN A 103 and LAN B 104. Each of the LANs 103 and 104 has a high-bit-rate Internet access apparatus (a home gateway capable of integrating a firewall) 105 and 106, PC type apparatuses 109 and 111, servers 110 and 113 for the storage and distribution of the digital media (of the audio, video and photo type) as well as digital media restitution apparatuses 108 and 112. A tunnel end-point may be integrated into an audiovisual apparatus such as a digital television set. It can also be presented in a PC type apparatus in the form of a program performing the functions associated with it.

Once the tunnel 100 is set up, the apparatuses 108, 109, and 110, connected to the LAN A 103, are capable of communicating with the apparatuses 111, 112 and 113, connected to the LAN B 104. For example, the customer 108 connected to the LAN A 103 can communicate with the server 113 connected to the network LAN B 104.

This FIG. 1a shows a simple communications network with only one tunnel, but it is understood that a same tunnel end-point may have to manage several tunnels (leading to an equivalent number of tunnel end-points) to interconnect a first LAN to several other LANs. Furthermore, for the sake of simplification, the figure does not show the infrastructure apparatuses in the Internet such as Internet routers.

Figure 1B:
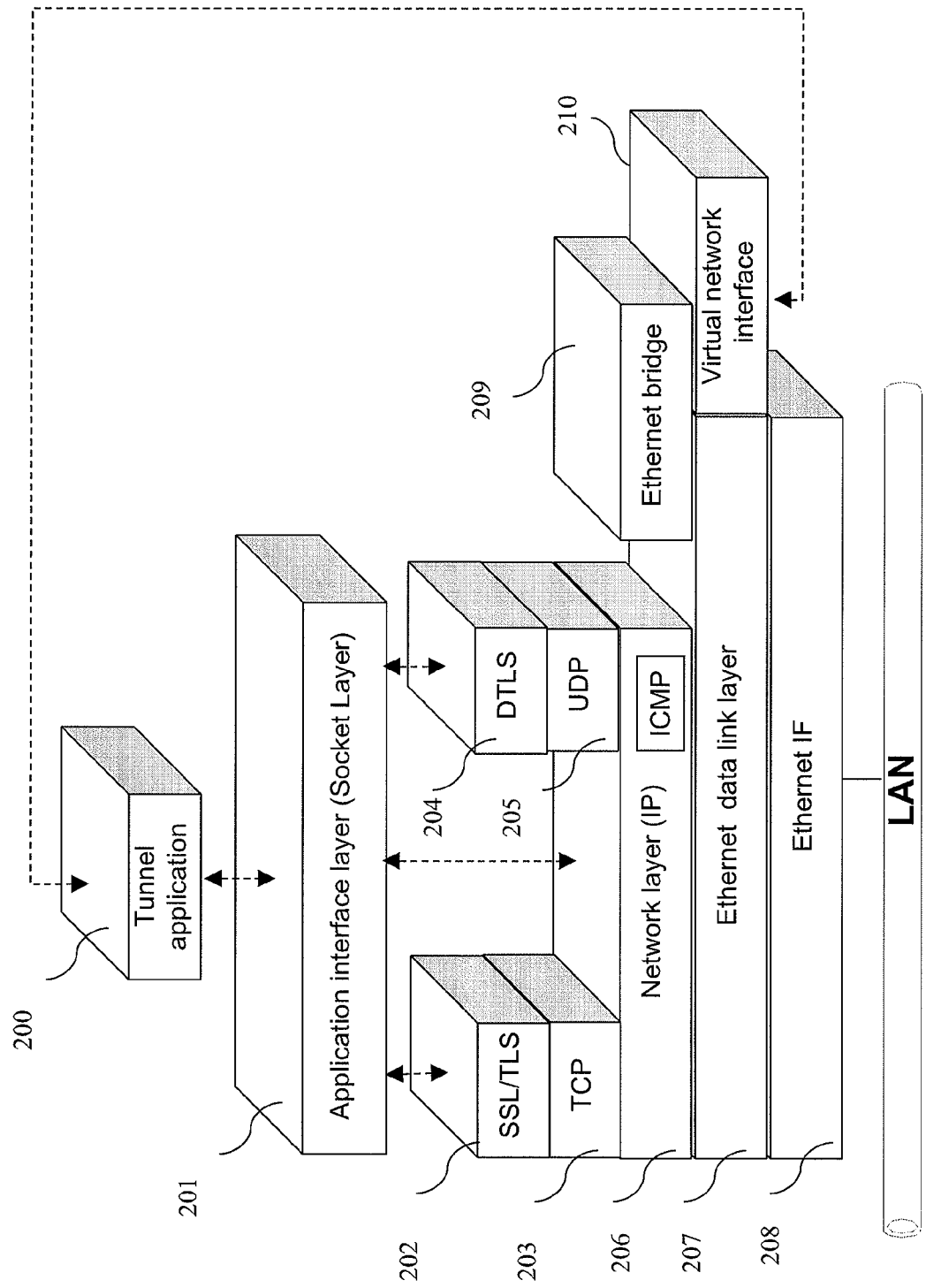
FIG. 1b shows an example of a classic layered model of a tunnel end-point in which the method of the invention can be implemented.

Referring to FIG. 1b, we shall now describe the routing of an Ethernet frame that comes from one of the apparatuses 108, 109, 110 (connected to the LAN B 103) and will enter the tunnel 100. To this end, a layered model will be used. This layered model describes the protocol layers needed for the implementation of this tunnel 100. In this model, the protocol elements necessary for functions other then the use of the tunnel are not represented. For example, the protocol elements associated with a UPnP architecture, when a tunnel end-point 101 is integrated into a UPN p apparatus, are not shown.

The tunnel end-point 101 has a Ethernet physical interface 208 which gives the Ethernet frames coming from the apparatuses 108, 109, 110 to the link layer 207 for routing: this routing is done toward the network layer 206, for the Ethernet frames intended for the apparatus comprising the tunnel end-point or toward the bridge layer 209 for the other Ethernet frames. The bridge layer 209 carries out the classic operations of an Ethernet bridge such as the filtering of Ethernet frames and the relay of these frames to the appropriate Ethernet output port or ports. The bridge has an Ethernet interface 207 and at least one virtual interface 210, simulating an Ethernet controller attached to it. A virtual interface 210 is created for each tunnel instantiated by the application 200 to which it gives the Ethernet frames that must travel in transit on the respectively instantiated tunnels. Generally, the protocol of encapsulation of the tunnel represented by the application 200 performs the operations necessary for implementing each tunnel, among them in particular the configuration, filtering and encapsulation (formation of a tunnel packet) and the extraction of a frame.

The frames received from the virtual interface 210, after processing by the application 200, are handed over in the form of a packet through an applications interface or socket 201 to a reliable TCP transport protocol 203 or to an unreliable UDP transport protocol 205, respectively secured by an SSL protocol 202 and a DTLS protocol 204. After processing by a transport protocol to form the tunnel packet 250 (FIG. 2a), it is passed on to the network layer 206. The IP datagram thus formed with the tunnel packet can now be transmitted on the LAN through the link layer 207 and physical layer 208.

The reception of a frame will take the reverse path, in the tunnel end-point, to the one presented here above.

Figure 2A:
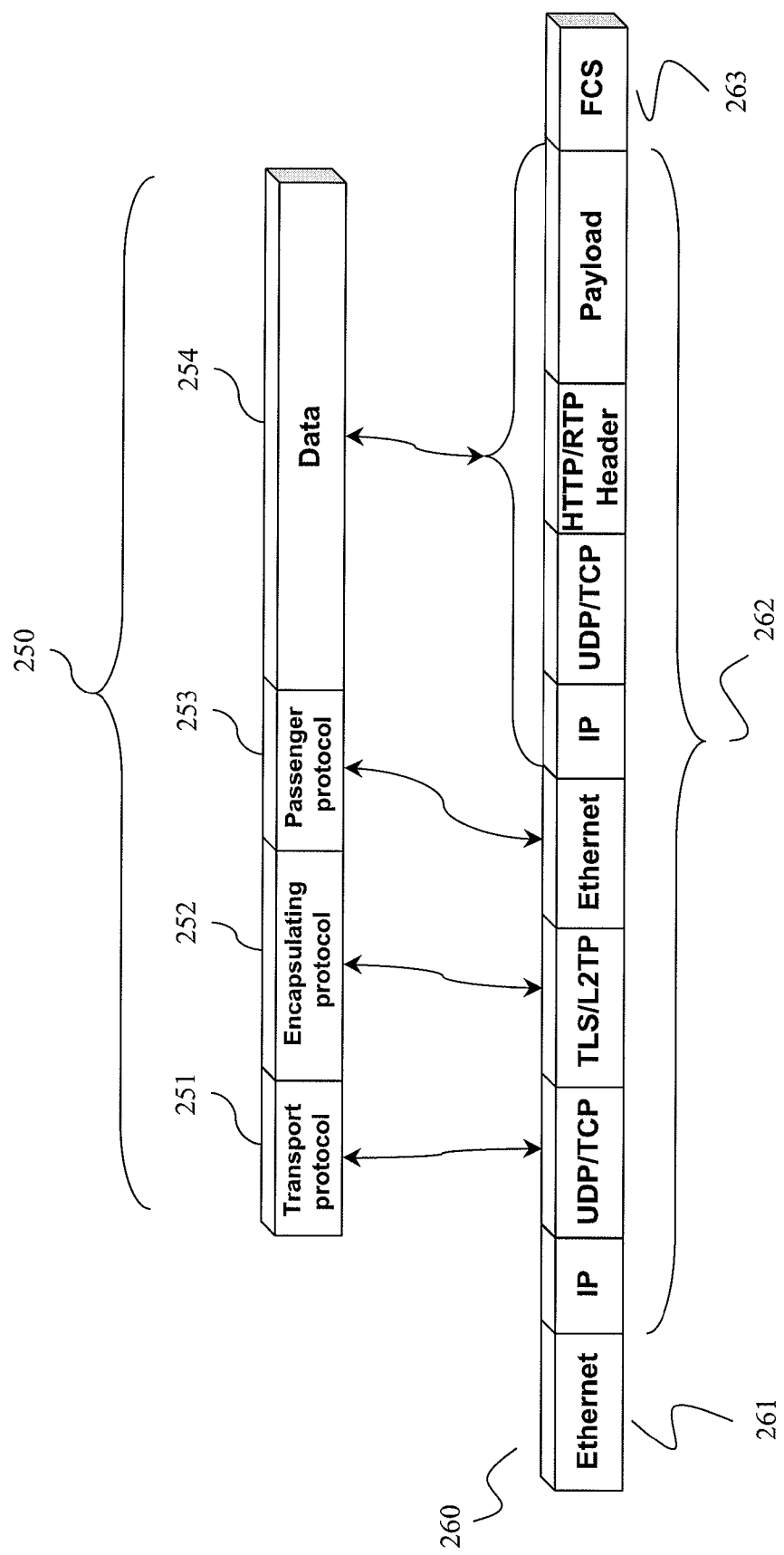
FIG. 2a shows an example of format of an Ethernet frame conveying a level 2 tunnel packet.

FIG. 2a presents an example of a format of an Ethernet frame (referenced 260) conveying a level 2 tunnel packet.

This format corresponds to a frame traveling, for example, on the LAN A 103 de FIG. 1a between the tunnel end-point 101 and the home gateway 105 (intended to be sent on the Internet or received from the Internet) and comprising an Ethernet header 3261, a first IP datagram itself conveying a level 2 tunnel packet (referenced 250) and a FCS ("Frame Check Sequence") field.

The tunnel packet 250 has four parts:
a header field of the transport protocol 251 (namely TCP UDP in this example),
a header field of the encapsulation protocol 252 (namely L2TP or TLS in this example, described especially in the document IETF RFC3931, "Layer two tunneling protocol—version 3 (L2TPv3)", J. Lau and all, March 2005 and the document IETF RFC2246, "The TLS Protocol Version 1.0"),
a header field of the passenger protocol 253 (i.e. Ethernet in this example), and finally a user data field 254 which itself comprises a second IP datagram which is complete if no fragmentation has taken place during its transit from the source equipment.

Figure 2B:
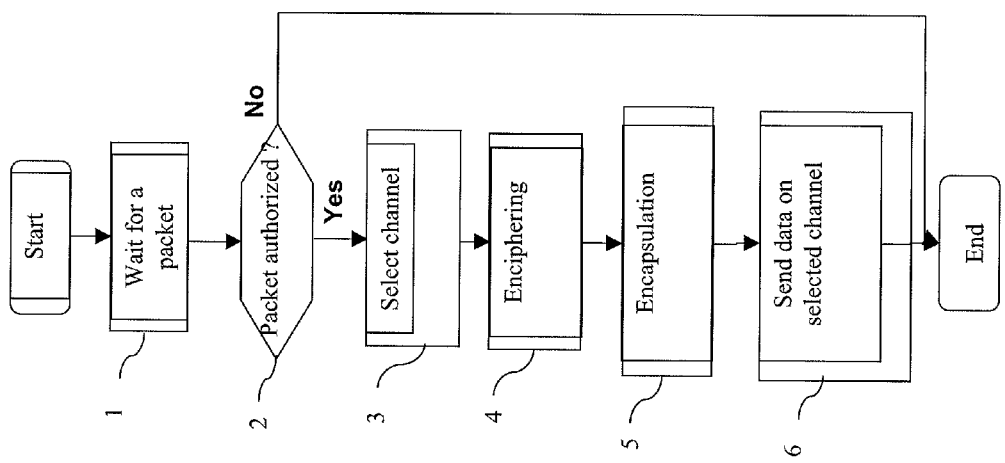
FIG. 2b is a flow chart of an outbound algorithm, executed by the tunnel end-point which transmits through the tunnel, in a particular embodiment of the method according to the invention.

Referring now to FIG. 2b, a description is provided of a LAN outbound algorithm executed by the tunnel end-point (for example the one referenced 101 in FIG. 1a), according to a particular embodiment of the method of the invention. This figure explains the general processing of data to be sent to the other tunnel end-point 102 through the tunnel 100.

In the step 1, we listen to network interface and capture IP or Ethernet data packets intended for it least one apparatus connected to the LAN B 104. This can be done by using a bridge, and with a few virtual network devices (such as TLN/TAP) added to the bridge.

In the step 2, it is decided whether or not the packet is authorized to be transmitted towards the LAN B. For example a packet received from the LAN B will not be transmitted towards this same LAN.

In the step 3, we select the most appropriate channel to be used to transmit the data packets to the LAN B 104. This step 3 is described in detail here below in relation to the other figures.

In the step 4 (optional step), an enciphering may be performed on the data to guarantee the secrecy of the user data. This step can be done using a well-known enciphering algorithm such as the AES (Advanced Encryption Standard) for example.

In the step 5, based on the result of the step 3, the received packet is encapsulated with an encapsulation protocol (also called a tunnelling protocol) associated with the channel selected at the step 3. This encapsulation protocol adds specific information (header) and can optionally add additional data to provide characteristics specific to the functions of the tunnel (such as for example a "keep alive" mechanism) enabling both tunnel end-points to know if the channel is still alive, i.e. if transmission is still possible). These additional functions may be dependent on the channel. For example, it may be worthwhile to add additional data to measure the RTT (round-trip time) of a UDP channel which classically does not give any RTT measurement mechanism. This can be done by adding a request for an immediate response (including an identifier) in the encapsulation data. When the remote tunnel header receives a request of this kind, it responds immediately. Upon reception of the response, the local tunnel header may then determine the RTT. Such a mechanism naturally does not need to be implemented in a channel that is already implementing an RTT evaluation mechanism (this is the case for example for a TCP-based channel) (Cf. "TCP/IP illustrated, Volumes 1, 2 and 3", Stevens, Wright, Addison-Wesley, 1994, 1995 and 1996).

In the step 6, the packet resulting from the encapsulation is transmitted on the channel selected in the step 3. This can be done by writing data to a connection interface (a socket) configured for sending packets on the tunnel. After this step, the packet will finally have the shape of the one referenced 250 in FIG. 2a. This step also updates the channel statistics (retransmission, type of data transmitted etc).

Figure 2C:
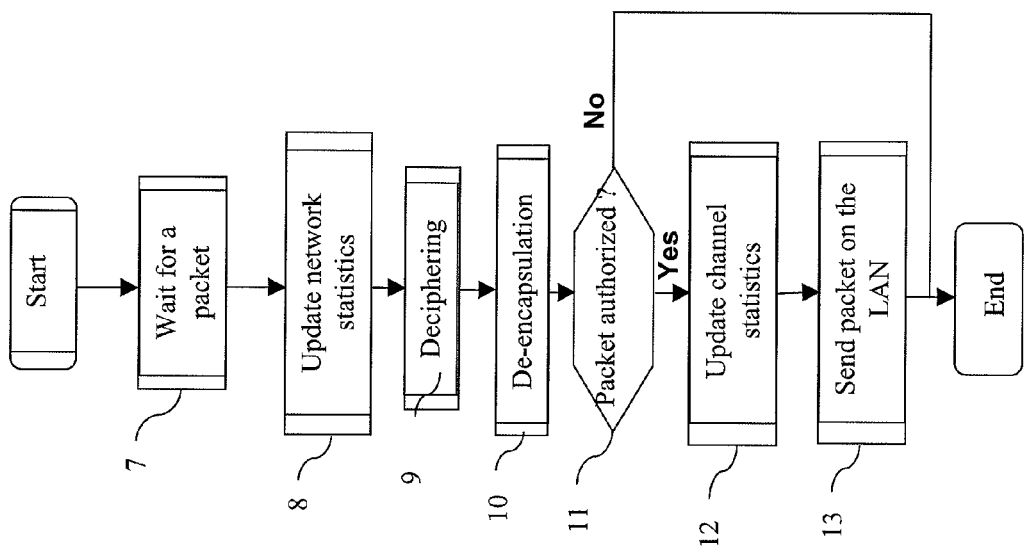
FIG. 2c is a flow chart of an inbound algorithm executed by the tunnel end-point which receives through the tunnel, according to a particular embodiment of the method according to the invention.

Referring out to FIG. 2c, a description is provided of an inbound algorithm on a LAN executed by the tunnel end-point (for example the one referenced 102 in FIG. 1a), according to a particular embodiment of the method of the invention. This figure explains the overall processing of data coming from the other tunnel end-point 101 and received through the tunnel 100.

In the step 7, we listen on each specific connection interface (socket) corresponding to each channel, to receive packets.

In the step 8, we update the information on network quality (retransmission, RTT, PER, congestion, etc.) of the channel on which reception is being made.

In the step 9, the payload data is deciphered (if the step 4 of FIG. 2b has been implemented) in using a deciphering algorithm and associated keys compatible with those used in the step 4.

In the step 10, the data packet is de-encapsulated to retrieve the original data packet (preliminarily captured on the LAN A 103 by the tunnel end-point 101). In this step we also process the additional data if any associated with optional additional mechanisms (see description of step 5).

In the step 11, it is decided whether the packet resulting from the de-encapsulation is permitted or not. For example, a packet whose deciphering or de-encapsulation does not give satisfactory results will not be authorized for transmission on the LAN A so as not to disturb the working of the apparatuses connected to this LAN.

In the step 12, the channel statistics (on bandwidth, type of data transmitted, etc) are updated.

In the step 13, the packet resulting from the de-encapsulation is sent on the LAN B 104. This can be done by using a virtual network device such as TUN/TAP.

A description is provided here below, with reference to FIG. 3, of an algorithm for the selection of an effective channel (detail of the step 3 of FIG. 2b) according to a particular embodiment of the method of the invention.

The packet received from the step 2 (FIG. 2b) is analyzed in the step 31 in order to determine whether it is an IP packet or not (because in this embodiment, only the IP packets are considered). This is done by analyzing the content of the packet (LLC header etc.). If it is not an IP packet, the procedure passes to the step 37 of selection of a default channel. This default channel can be determined by the user, and is for example a TCP channel. If it is an IP packet, the operation passes to the step 32.

In this step 32, the packet is classified (all the information concerning the packet that will subsequently be used to select the best channel is extracted). Typically, to determine the type of packet (result of the classification) as a function of its payload data, we determine the payload data transport protocol (transport protocol on IP), this information being encoded in the eight reserved bits of the IP header. Here below in the description, we shall use the payload data transport protocol as an identifier of packet types (TCP, UDP, SCTP, DCCP, etc.).

In the step 33, we determine whether the type of packet determined in the step 32 is managed by the step 35 here below. If not, the operation passes to the step 37. If the answer is yes, the operation passes to the step 34.

For instance, in the particular embodiment discussed herein, TCP and UDP are passenger protocols managed by the step 35 here below. For other passenger protocols a default channel is selected in the step 37. Such protocols are for instance transport protocols as DCCP ("Datagram Congestion Control Protocol") or SCTP ("Stream Control Transmission Protocol"), or resource reservation protocols as RSVP ("Resource Reservation Protocol>>), as well as non-layer 4 (in the ISO model) protocols such as ICMP ("Internet Control Message Protocol") or IGMP ("Internet Group Multicast Protocol"). Packets of such type of passenger protocols are therefore transmitted in the tunnel with a single channel. As for non-IP packets, the default channel might be set by the user or might consist in a preset default value; it can be noted that defining TCP channel as default channel for the above-mentioned passenger protocols (that are not managed by step 35) allows applying a conservative policy.

In the step 34, we determine the QoE ("Quality Of the Experiment"). To this end, all the data concerning the quality of the network (congestion, PER, bandwidth, RTT, retransmission rate, etc) is retrieved. All this data is evaluated whenever the packet is sent or received by the tunnel (steps 8, 12, 384 and 387).

In the step 35, we determine a preferred channel (and therefore a preferred transport protocol) to be used to transmit the payload data to the remote LAN as efficiently as possible. A channel may be characterized solely by its transport protocol but other characteristics can be used, for example the TOS (type of service) parameter. Three possible strategies for determining the preferred channel are given here below by way of examples (steps 35a, 35b and 35c, in FIGS. 4, 5 and 6 respectively).

In the step 36, we determine a mode of transport for the type of packet being processed (here below called "processed packet"). The mode of transport corresponds to the way of managing the transmission of a given type of packet. This mode may be stable (TCP or UDP for example) or transient (TCP-to-UDP or UDP-to-TCP, for example).

Figure 6:
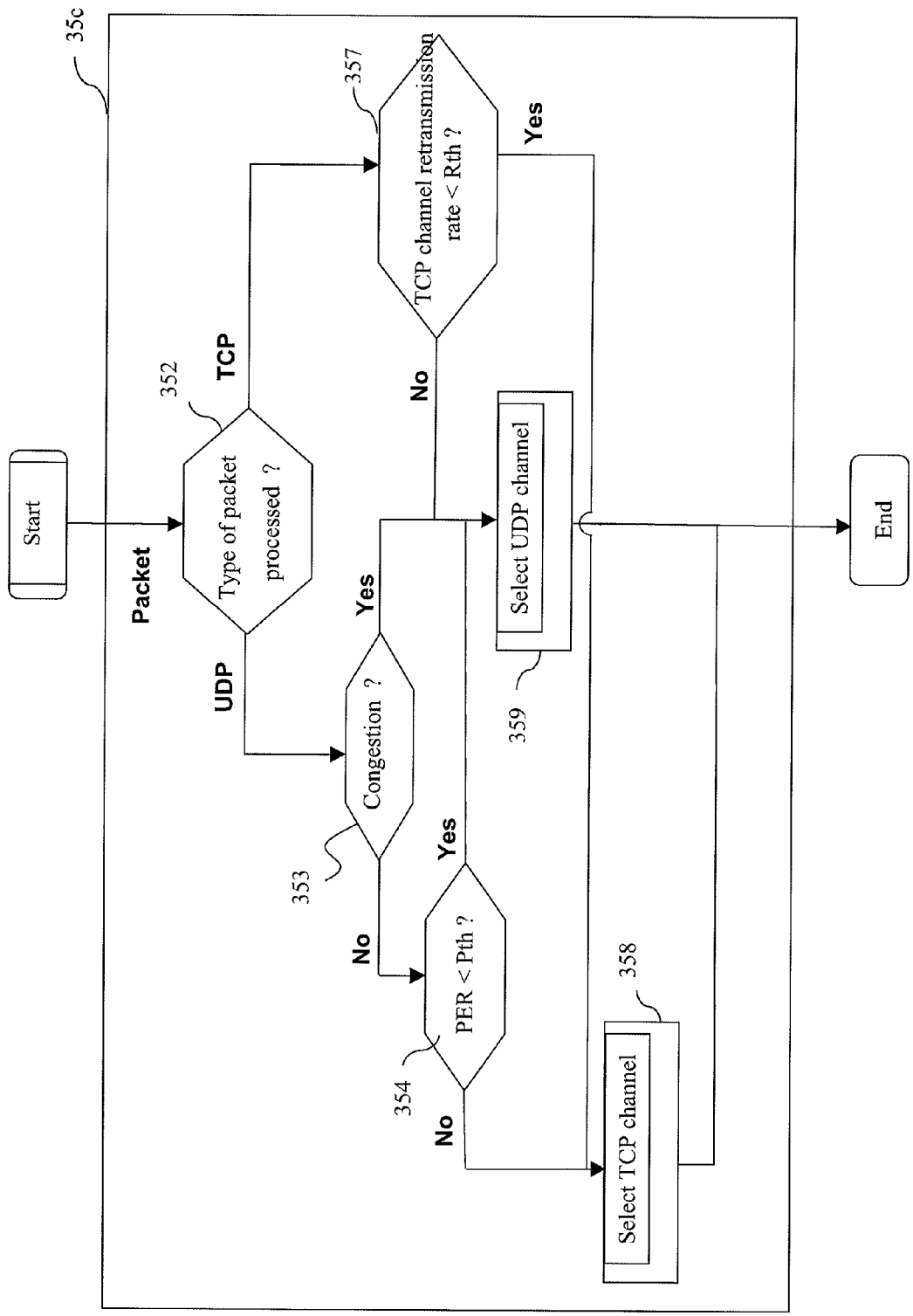
Figure 7A:
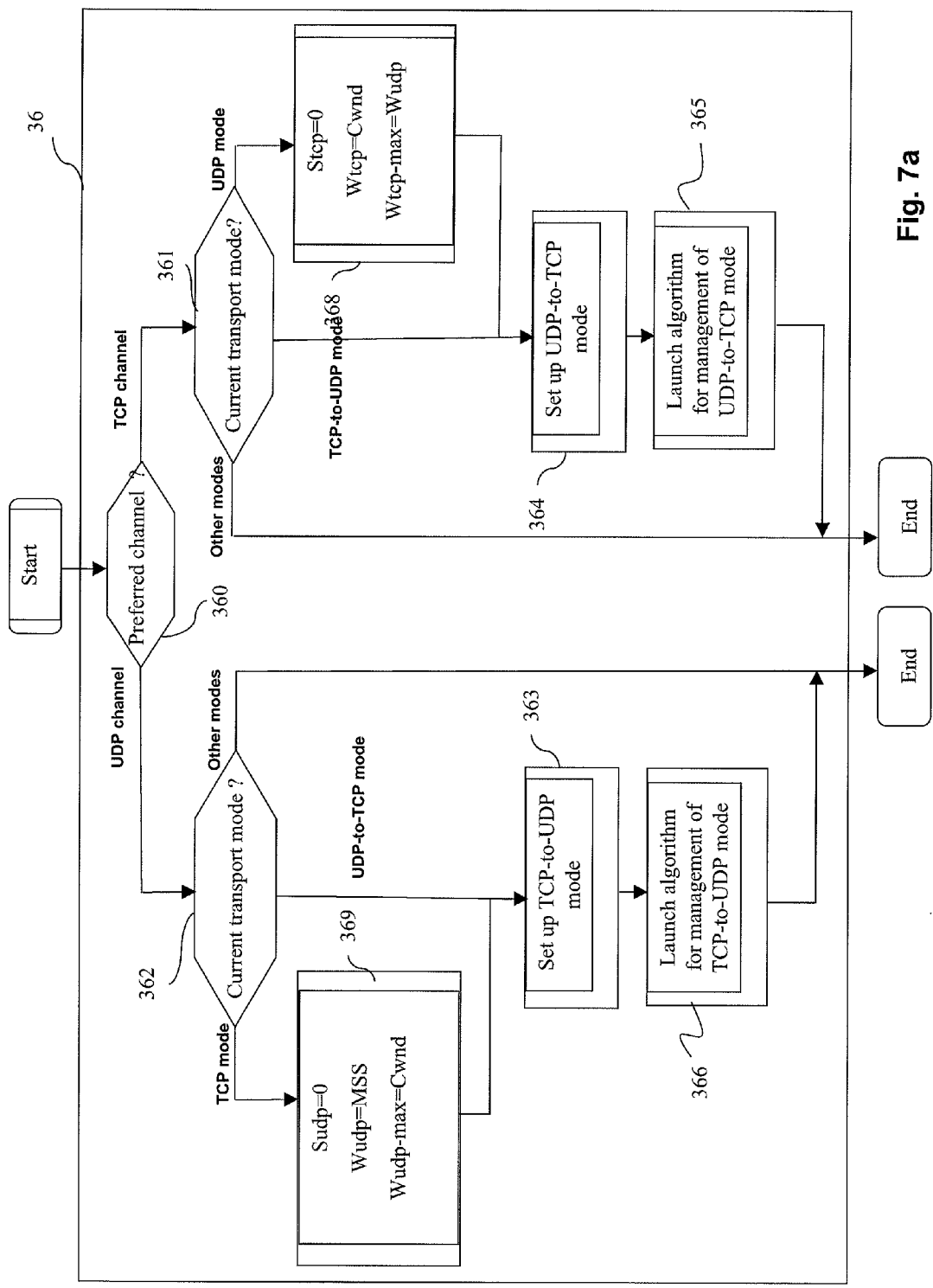
FIG. 7a is a flow chart of an algorithm for the management of the current mode of transport and of transmission windows for a type of packet (detail of step 36 of FIG. 3) according to a particular embodiment of the method according to the invention.
Figure 8A:
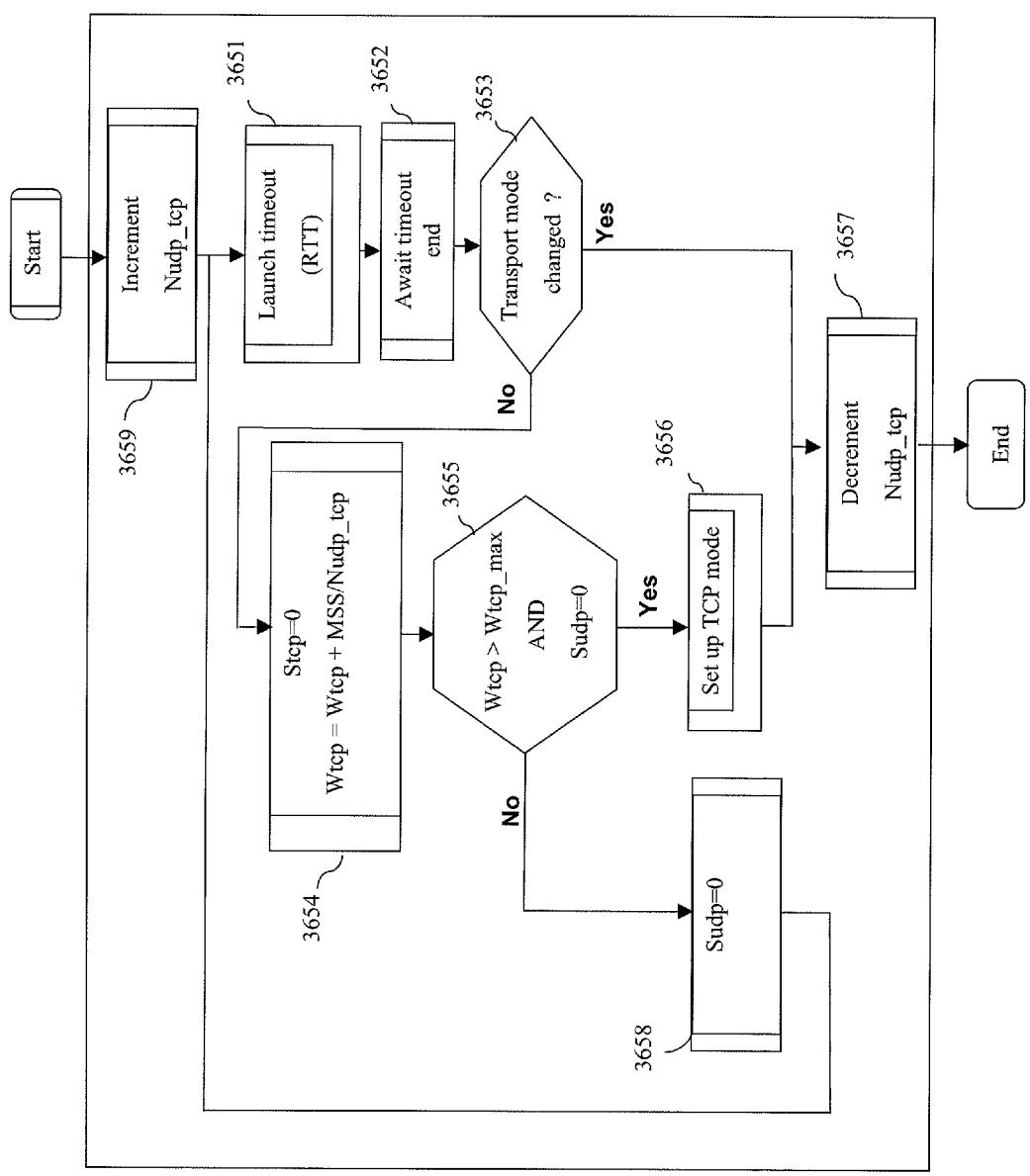
FIG. 8a is a flow chart of an algorithm for the management of a transient UDP-to-TCP mode according to a particular embodiment of the invention.
Figure 8B:
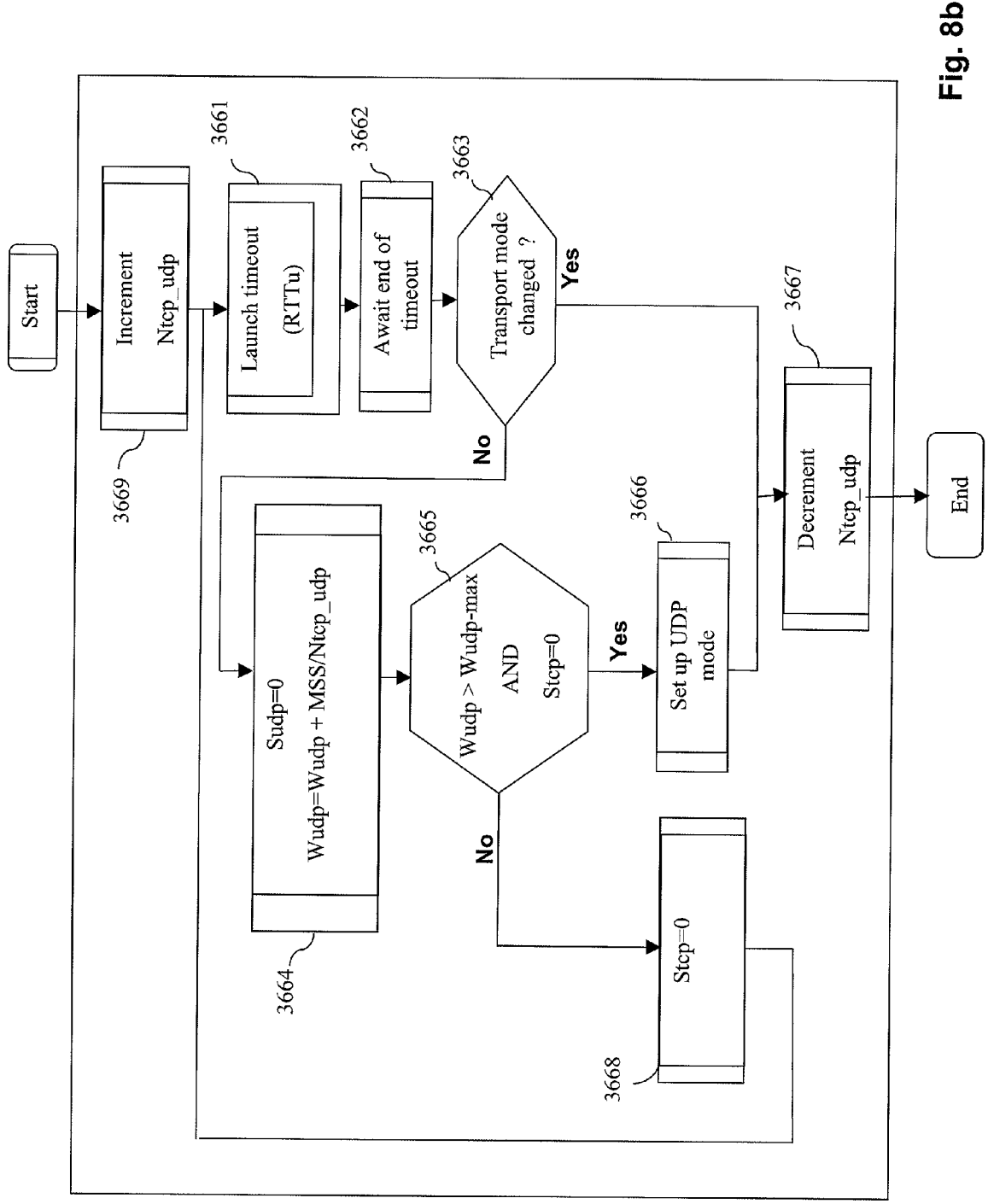
FIG. 8b is a flow chart of an algorithm for the management of a transient TCP-to-UDP mode according to a particular embodiment of the invention.

A possible implementation of this step 36 is illustrated in FIGS. 7a, 8a and 8b. In this implementation, we consider the case of channels characterized by their transport protocol (to be compatible with FIGS. 4, 5 and 6). Depending on the preferred transport protocol and the current mode of transport for the type of packet processed, at the step 36, the progress of the transport mode is managed (among four possible modes: two stable modes TCP and UDP and two transient modes TCP-to-UDP, and UDP-to-TCP) for each type of packet (type determined in the step 32). For example if, at the step 35, it is determined that for a UDP type packet, also called a UDP packet (i.e. a packet for which UDP is the payload data protocol of the passenger protocol), the preferred transport protocol is TCP (i.e. the preferred channel is the TCP channel), but the current transport mode for the UDP packets is the UDP mode whereas, in the step 36, we enter the transient UDP-to-TCP mode, and the effective transmission channel for the processed packet may be either the preferred TCP channel or the UDP channel (see below detailed description of FIGS. 7a, 7b, 8a, 8b and 8c).

Figure 8C:
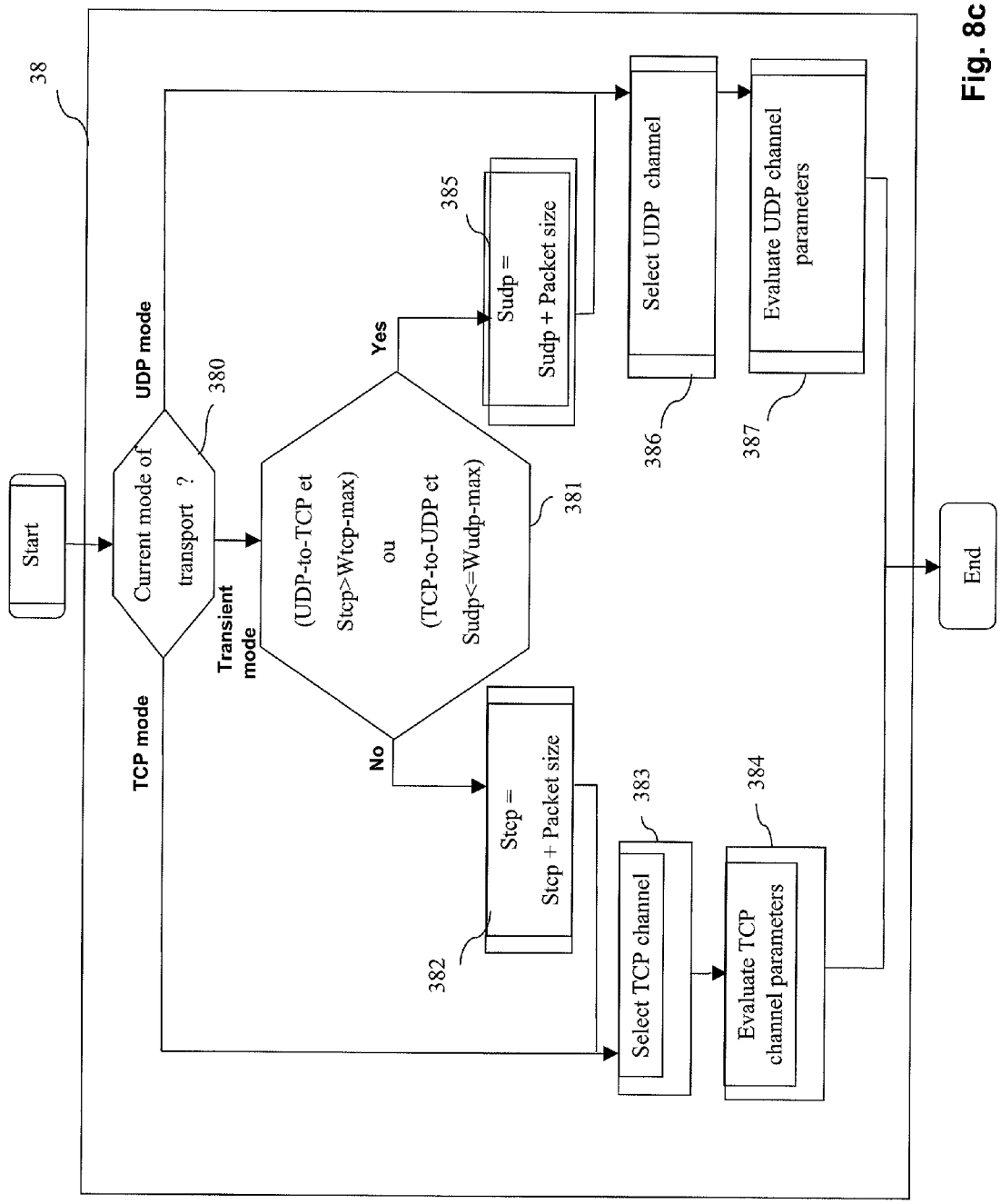
FIG. 8c is a flow chart of an algorithm for the selection of the effective channel for a type of packet (detail of step 38 of FIG. 3), according to a particular embodiment of the method according to the invention.

In the step 38, the effective channel is selected as a function of the preferred channel (cf. step 35) of the current transport mode and of transmission window parameters (see description here below) for the type of packet processed. A possible implementation of this step 38 is illustrated in FIG. 8c. This is a selection mechanism used to pass smoothly from one mode of transport to another, for a given type of packet. This mechanism is important to avoid "artificial" congestion of the tunnel.

For example, if the preferred transport protocol for a type of packet switches from UDP to TCP, it is not possible to directly send all the packets of this type on the TCP channel because the sudden increase in the number of packets to be transmitted on this TCP channel will gradually lead to the TTP congestion window being exceeded. Consequently, the packets will be delayed or buffered by the TCP stack even if the truly available bandwidth is big enough. These buffered packets will increase the measured RTT of the end-to-end communication and may give rise to unnecessary retransmission in the case of TCP packets (with the expiry of a retransmission timeout called RTO ("Retransmission Time Out") in the TCP case).

In the case of a switching from the TCP transport mode to the UDP transport mode, it is necessary to watch for a sudden increase in the size of the UDP channel, which may suddenly slow down the TCP transmission, also giving rise to problems.

Figure 3:
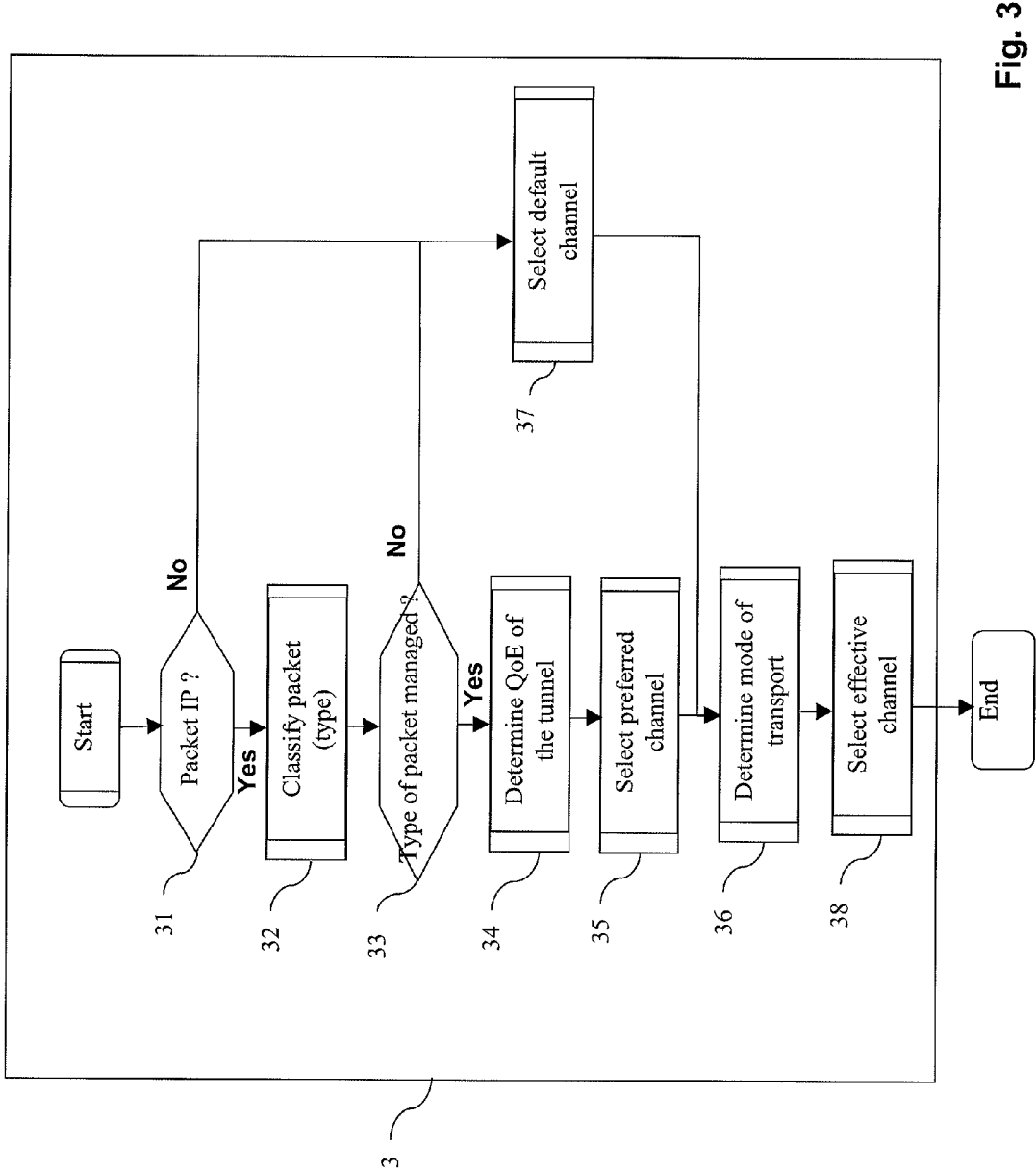
FIG. 3 is a flow chart of an algorithm for the selection of an effective channel (detail of step 3 of FIG. 2b), according to a particular embodiment of the method according to the invention.
Figure 4:
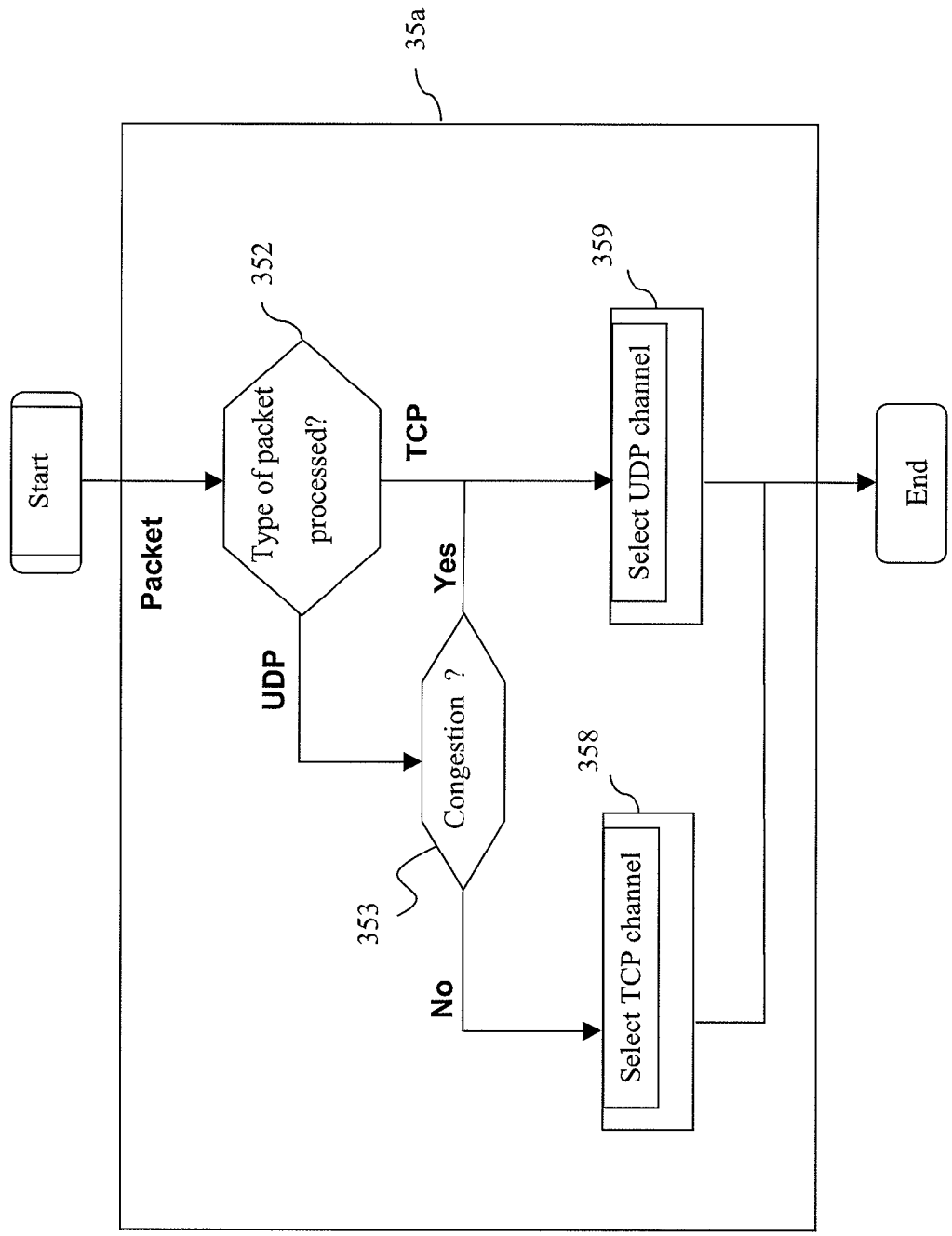
FIGS. 4, 5 and 6 are flow charts of three distinct algorithms for the selection of a preferred channel (detail of step 35 of FIG. 3), according to a particular embodiment of the method according to the invention.

FIG. 4 shows a first example of a preferred algorithm for selection of the channel, i.e. selection of the preferred transport protocol (detail referenced 35a in the step 35 of FIG. 3). In this first example, only the ECN notification mechanism is used.

The strategy chosen in this first example is that of sending the TCP packets on the UDP channel to prevent problems of the "TCP over TCP" combination) and of sending the UDP packets on the TCP channel (to provide the same reliability as on the LAN) only if there is no congestion of the network. In the event of congestion of the network, the UDP packets are sent on the UDP channel (to keep the UDP speed, even if some packets are eliminated).

In a step 352, the type of packet processed i.e. the protocol for the transport of the payload data contained in this processed packet, is determined.

If the packet is a TCP packet, the step 359 is executed. In this step, the UDP channel is chosen as a preferred channel for the processed packet.

If the packet is a UDP packet, the step 353 is executed. In this step, it is determined whether a congestion of the network has been detected (in the step 8) through the ECN notification mechanism.

If no congestion has been detected then the step 358 is executed. In this step, the TCP channel is chosen as the preferred channel for the processed packet. If a congestion has been detected, the step 359 is executed. In this step, the UDP channel is chosen as the preferred channel for the processed packet.

Figure 5:
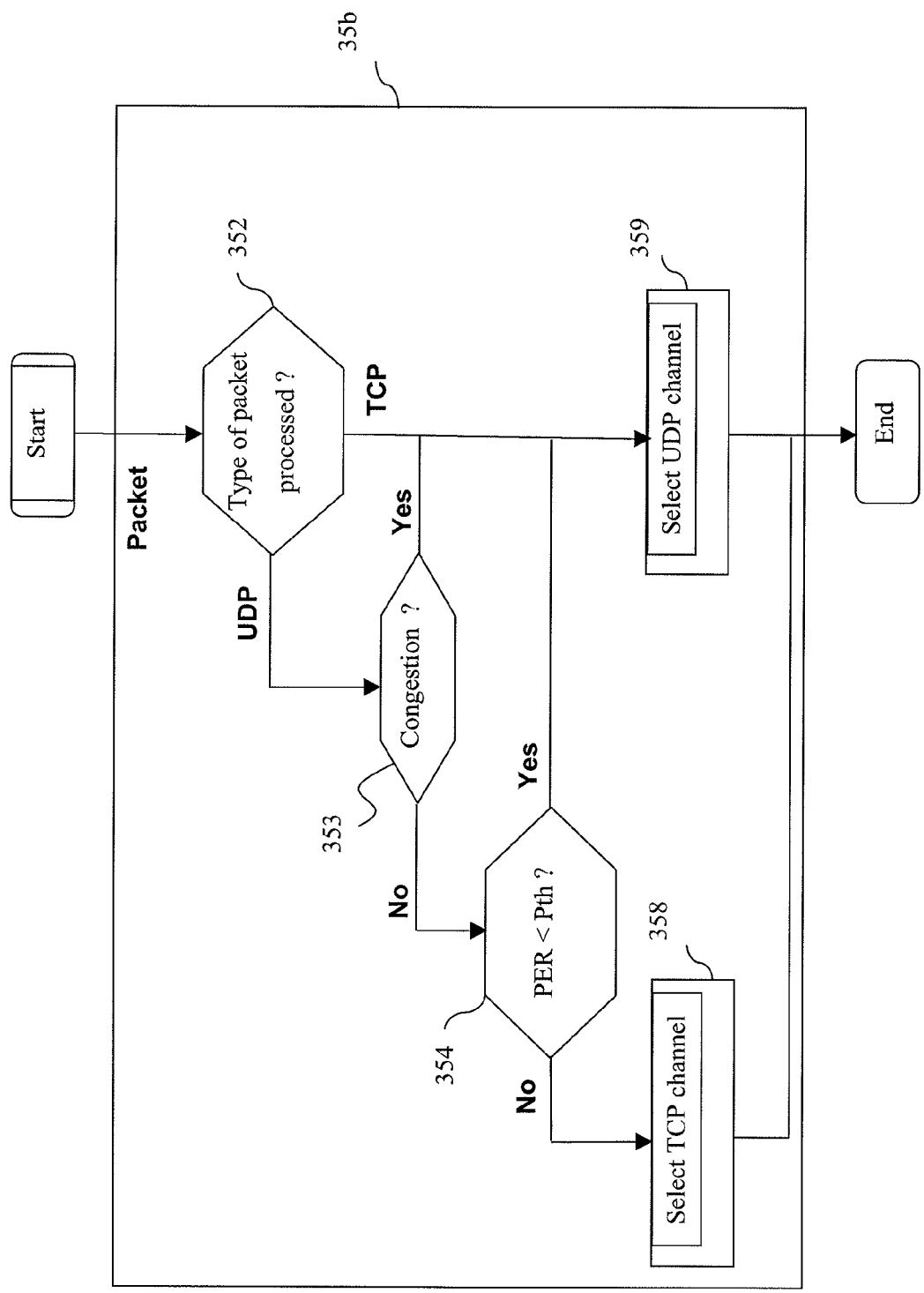

FIG. 5 shows a second example of an algorithm for selection of the preferred channel, i.e. the preferred transport protocol (detail referenced 35b of the step 35 FIG. 3). In this second example, the ECN notification mechanism and the packet error rate (PER) are used jointly.

In this second example, the PER of the network is compared with a determined threshold Pth (chosen for example by the user) in a new step 354.

In this case, when the step 353 detects no congestion, the operation passes to the step 354 (instead of directly executing the step 358 as in FIG. 4).

In the step 354, if the PER is high (greater than or equal to the threshold Pth), but if the step 353 indicates that there is no congestion, it is useful to choose the TCP channel as the preferred channel for the processed packet in order to increase end-to-end reliability. If not (if the PER is lower than the threshold Pth), the UDP channel is chosen as the preferred channel for the processed packet.

FIG. 6 shows a third example of an algorithm for selection of the preferred channel, i.e. the preferred transport protocol (detail referenced 35c of the step 35 of FIG. 3). In this third example, the ECN notification mechanism, the packet error rate (PER) and the retransmission rate on the TCP channel are used jointly.

For the TCP packets, it is known (see the above-mentioned document: "Understanding TCP over TCP ( . . . )") that numerous retransmissions in the tunnel can generate retransmissions in the TCP communication from end to end, generating unnecessary retransmissions. To prevent such a situation, it is proposed here above (cf FIGS. 4 and 5) to send the TCP packets on the UDP channel. However, it may be useful to allow the tunnel to retransmit the packets to ensure the reliability of the tunnel. In order to achieve this, this third example takes account of the retransmissions on the TCP channel. If the retransmission rate on the TCP channel is below a threshold Rth (for example 10%) it is worthwhile to send the TCP packets on the TCP channel. If the retransmission rate on the TCP channel is greater than or equal to the threshold Rth, the TCP packets are sent on the UDP channel.

As compared with FIG. 5, there is therefore an additional step 357 (at output of the step 352) in which a check is made to detect whether the rate of retransmission on the TCP channel is below the threshold Rth. If the response is yes, the operation passes to the step 358 in which the TCP channel is chosen as a preferred channel for the processed packet. If the answer is no, the operation passes to the step 359 in which the UDP channel is chosen as the preferred channel for the processed packet.

Referring to FIG. 7a, we now present an algorithm for the management of the current mode of transport and of transmission windows for a type of packet (see detail of the step 36 in FIG. 3) according to a particular embodiment of the method of the invention.

For each of the types of packet therefore, we manage a mode of transport and two transmission windows (one per transmission channel of the tunnel). A transmission window associated with a given channel is defined by a set of parameters (see FIG. 7b) used to define a maximum quantity of data that can be transmitted on a given channel during a determined duration (corresponding to RTT). For a given type of packet, depending on the mode of transport, the two windows will increase or decrease in order to smoothly switch from one channel to another.

It may be recalled that the type of a packet being processed (or processed packet) is determined during the classification step 32 of FIG. 3.

The present example considers two types of packets: TCP packet or UDP packet. For each of these two types of packet, one mode of transport and two transmission windows are managed. These transmission windows are here below called "TCP transmission window" and "UDP transmission window".

It is important to note that the following description of FIG. 7a is made for a packet with a given type, and, therefore, that whenever the mode of transport or a window parameter (Wtcp, Stcp, Wtcp_max, Wudp, Sudp, Wudp_max) is mentioned, it must be understood that this is a mode of transport or a window parameter belonging to a set of variables proper to said given type of packet (cf FIG. 7b). The same observation applies to FIGS. 8a, 8b and 8c described here below.

For a processed packet having a given type, we reach the step 360 after having determined the preferred transmission channel at the step 35 (FIG. 3) (implemented for example according to one of the three strategies of FIGS. 4, 5 and 6).

In the step 360, the switching is done according to the preferred channel: the operation passes to the step 361 if the preferred channel is the TCP channel (i.e. if the preferred transport protocol is TCP) or to the step 362 if the preferred channel is the UDP channel (i.e. if the preferred transport protocol is UDP).

In the step 362 (the case where the preferred channel is the UDP channel), the switching is done as a function of the current transport mode (for the type of packet processed).

If, at the step 362, the current mode is the stable TCP mode (associated with a previous preferred channel which is the TCP channel), the system must enter the transient TCP-to-UDP mode, which is set up at the step 263. Preliminarily, the method passes to the step 369, in which the window parameter is initialized for the type of packet processed:

the quantity of data already transmitted on the UDP channel for the type of packet processed (Sudp) is set at 0 (Sudp=0);

the size (Wudp) of the UDP window (maximum quantity of data that can be transmitted on the UDP channel) is set at the maximum segment size (MSS) of the TCP over TCP channel connection (Wudp=MSS);

the stop condition (Wudp_max), which corresponds to the maximum size of the TCP window is set at the current value (Cwnd) of the TCP congestion window (Wudp_max=Cwnd). This stop condition will determine the output of the transient TCP-to-UDP mode.

If, at the step 362, the current mode is the transient UDP-to-TCP mode (associated with a preferred previous channel which is the TCP channel), the system here too must enter the transient TCP-to-UDP mode which is set up at the step 263. It is possible to preserve the window parameters, for the type of packet processed, which have already been reset (see FIG. 8*a*).

If, at the step 362, the current mode is the stable UDP mode (associated with a previous preferred channel which is the UDP channel) or the transient TCP-to-UDP mode (associated with a preferred previous channel which is the UDP channels), no action is necessary.

After the step 363, the operation passes to the step 366 in which the execution of the algorithm of management of the transient TCP-to-UDP mode (described here below with reference to FIG. 8*b*) is launched. After this launching, the operation passes to the step 38 of FIG. 3.

In the step 361 (the case where the preferred channel is the TCP channel), a switch-over is done as a function of the current mode of transport (for the type of packet processed).

If, at the step 361, the current mode is the stable UDP mode (associated with a previous preferred channel which is the UDP channel), the system must enter the transient UDP-to-TCP mode, which is set up at the step 364. As a preliminary, the operation passes to the step 268 in which the window parameters for the type of packet processed are initialized:

the quantity of data already transmitted on the TCP channel for the type of packet processed (Stcp) is set at 0 (Stcp=0);

the size (Wtcp) of the TCP window (maximum quantity of data that can be transmitted on the TCP channel) is set at the size of the current (Cwnd) of the TCP congestion window ((Wtcp=Cwnd). Thus, initially, the two windows (Wtcp and Cwnd) have the same size;

the stop condition (Wtcp_max), which corresponds to the maximum size of the TCP window, is set at the current value of the UDP window (Wudp). This stop condition will determine the output of the transient UDP-to-TCP mode.

If, at the step 361, the current mode is the transient TCP-to-UDP mode (associated with a preceding preferred channel that is the UDP channel), the system here too must enter the transient UDP-to-TCP mode, which is set up at the step 364. It is possible to keep the already initialized window parameters (cf. FIG. 8*b*) for the type of packet processed.

If, at the step 361, the current mode is the stable TCP mode (associated with a preceding preferred channel which is the TCP channel) or the transient UDP-to-TCP mode (associated with the preceding preferred channel which is the TCP channel), no action is necessary.

After the step 364, the operation passes to the step 365 for launching the execution of the algorithm for management of the transient UDP-to-TCP mode (described here below with reference to FIG. 8*a*). After this launching, the operation passes to the step 38 of FIG. 3.

FIG. 7*b* presents a table of the types of packet according to a particular embodiment of the method of the invention. This table 4000 indicates the set of the variables to be considered for each type of packet.

More specifically, the table 4000 contains one row per type of packet (for example a TCP packet or a UDP packet). The column 4002 indicates the current mode of transport for this type of packet. The columns 4003 to 4005 give the values of the variables (Wtcp, Stcp and Wtcp_max respectively, already discussed further above) defining the TCP transmission window, for this type of packet. The columns 4006 to 4008 and given the values of the variables (Wudp, Sudp and Wudp_max respectively, already discussed here above) defining the UDP transmission window.

Two additional variables Nudp_tcp and Ntcp_udp provide knowledge, at all times, of the number of types of packet in the transient UDP-to-TCP and TCP-to-UDP modes respectively. These two variables are important for determining the step of incrementing the transmission windows (cf steps 3654 and 3664 in FIGS. 8*a* and 8*b*). Indeed, the progress of the transmission window in the transient UDP-to-TCP mode and the transmission window in the transient TCP-to-UDP mode respectively, so as to follow the natural progress of the size (Cwnd) of the congestion window, must take account of all the types of packet taken into account by the transient mode considered. If not, if each of the types of packet were to be taken into account independently, the progress of the transmission window in the transient UDP-to-TCP mode and the transmission window in the transient TCP-to-UDP window respectively would not follow the natural progress of the size (Cwnd) of the congestion window and there would be a risk of going beyond the threshold of quantity of data acceptable by the TCP transport protocol in the transient UDP-to-TCP mode and the quantity of data acceptable by the UDP transport protocol in the transient TCP-to-UDP mode.

FIG. 8*a* presents an algorithm for the management of the transient UDP-to-TCP mode according to a particular embodiment of the method according to the invention.

This figure describes the way in which, for a given packet, the parameters of the TCP and UDP transmission windows (for this given type of packet) develop to enable a smooth switching from the stable UDP transport mode to the stable TCP transport mode.

In order to avert problems due to the sending of an excessively large number of packets on the TCP channel as compared with the size (Cwnd), the invention takes account of the mechanism planned in the TCP channel to prevent congestion and the size (Wtcp) of the TCP (virtual) transmission window is increased to match the natural progress of the size (Cwnd) of the congestion window.

In a step 3659, the number (Nudp_tcp) of types of packet in the UDP-to-TCP mode is incremented by one unit.

Then, to manage the size (Wtcp) of the TCP transmission window, a timeout is launched in the step 3651 (corresponding to the RTT of the TCP channel, updated whenever a packet is received, cf step 12), and, at the step 3652, the expiry of this timeout is awaited.

In the meantime (between the steps 3651 and 3652), packets are sent in compliance with the step 38 (the step 38 is carried out once for each packet).

After the timeout has expired, a test is performed in the step 3653 to find out if the mode of transport has changed (following a modification of the preferred channel at the step 35, it may be decided at the step 36 to change the mode of transport from the transient UDP-to-TCP mode to the transient TCP-to-UDP mode).

If the transport mode has changed, the operation passes, before ending, to the step 3657 in which the number (Nudp_tcp) of types of packet in the UDP-to-TCP mode is decremented.

If the transport mode has not changed, the algorithm runs on to continue the management of the progress of the TCP (virtual) transmission window. The operation passes to the step 3654 in which the size (Wtcp) of the TCP transmission window is increased by MSS/Nudp_tcp. Thus, the maximum development of the size (Cwnd) of the TCP congestion window is followed in averting congestion and in taking and account of the fact that the Nudp_tcp types of packet are simultaneously in the transient UDP-to-TCP mode. Furthermore, in the step 3654, the quantity of data already transmitted on the TCP channel for the type of packet processed (Stcp) during the last RTT is set at 0 (Stcp=0).

In the step 3655, it is decided whether the transient phase in the transient UDP-to-TCP mode has ended. To this end, a check is made to see whether the size (Wtcp) of the TCP transmission window has been sufficiently increased (Wtcp>Wtcp_max?), and if there is no longer any data sent on the UDP channel for the type of packet processed (Sudp=0?).

If the transient phase has ended, the operation passes to the step 3656 in which the stable TCP mode is set up. Then, before ending, the operation passes to the step 3657 in which the number (Nudp_tcp) of types of packet in the UDP-to-TCP mode is decremented.

If the transient phase is not ended, the operation passes to the step 3658 in which the quantity of data already transmitted on the UDP channel for the type of packet processed (Sudp=0) is set at zero. Then the operation returns to the step 3651 and a new timeout is launched.

FIG. 8b presents an algorithm for management of the transient TCP-to-UDP mode according to a particular embodiment of the method of the invention.

This figure describes how, for a given type of packet, the parameters of the TCP and UDP transmission windows (for this given type of packet) develop to enable smooth switching from the stable TCP transport mode to the stable UDP transport mode.

This mechanism of management of the UDP transmission window is similar to the one described here above with reference to FIG. 8a for the TCP transmission window. The size (Wudp) of the UDP transmission window indicates the maximum quantity of data that can be transmitted on the UDP channel in a duration RTTu. This duration RTTu is a value computed by the system and corresponds to a round-trip time as described for TCP (this value can be computed by periodically sending a specific control request from one tunnel end-point to another, the other tunnel end-point immediately complying with this request).

To avert congestion due to the sending of an excessively large number of packets on the UDP channel (before the TCP channel has finished emptying its buffer) it is not possible to abruptly switch from entirely TCP transmission to entirely UDP transmission. The mechanism of FIG. 8B (similar to that of FIG. 8a) is therefore used.

In a step 3669, the number (Ntcp_udp) of types of packets in the TCP-to-UDP mode is therefore incremented by one unit.

Then, to manage the size (Wudp) of the UDP transmission window, a timeout is launched in the step 3661 (corresponding to the above-mentioned RTTu), and the expiry of this timeout is awaited at the step 3662.

In the meantime (between the steps 3661 and 3662), packets are sent in compliance with the step 38 (this step 38 is performed once for each packet).

After the timeout has expired, a test is made in the step 3663 to find out if the transport mode has changed (following a modification of the preferred channel at the step 35, it may be decided at the step 36 to change the transport mode from the transient TCP-to-UDP mode to the transient UDP-to-TCP mode).

If the transport mode has changed, the operation passes before ending to the step 3667 in which the number (Ntcp_udp) of types of packet in the TCP-to-UDP mode is decremented.

If the transport mode has not changed, the algorithm runs on to continue the management of the progress of the UDP (virtual) transmission window. The operation passes to the step 3664 in which the size (Wudp) of the UDP transmission window is increased by MSS/Ntcp_udp. Furthermore, in the step 3664, the quantity of data already transmitted on the UDP channel for the type of packet processed (Sudp) during the last RTT is set at 0 (Sudp=0).

In the step 3665, it is decided whether the transient phase in the transient TCP-to-UDP mode has ended. To this end, a check is made to see whether the size (Wudp) of the UDP transmission window has been sufficiently increased (Wudp>Wudp_max?), and if there is no longer any data sent on the TCP channel for the type of packet processed (Stcp=0?).

If the transient phase has ended, the operation passes to the step 3666 in which the stable UDP mode is set up. Then, before ending, the operation passes to the step 3667 in which the number (Ntcp_udp) of types of packet in the TCP-to-UDP mode is decremented.

If the transient phase is not ended, the operation passes to the step 3668 in which the quantity of data already transmitted on the TCP channel for the type of packet processed (Stcp=0) is set at zero. Then the operation returns to the step 3661 and a new timeout is launched.

Referring now to FIG. 8c, we present an algorithm for the selection of the effective channel for a type of packet (detail of the step 38 of FIG. 3) according to a particular embodiment of the method of the invention.

In a step 380, a switching is carried out according to the current transport mode (for the type of packet processed).

If, at the step 380, the current mode is the stable TCP mode, then the operation passes to the step 383 in which the TCP channel is chosen as the effective transmission channel, and then to the step 384 in which the parameters of the TCP channel are evaluated (for example average throughput, congestion window etc).

If at the step 380 the current mode is the stable UDP mode, then the operation passes to the step 386 in which the UDP channel is chosen as the effective transmission channel and then to the step 387 in which the parameters of the UDP channel are evaluated (for example average throughput, congestion window etc).

If, at the step 380, the current mode is one of the transient modes (TCP-to-UDP or UDP-to-TCP), then the operation passes to the step 381 in which the channel towards which the packet has to be sent is determined. To this end, a check is made to see whether the maximum quantity of data to be transmitted on the preferred channel has been reached or not (in the case of the transient UDP-to-TCP mode, it is ascertained that "Stcp>Wtcp-max"; in the case of the TCP-to-UDP transient mode, it is ascertained that "Sudp>Wudp-max"). If this maximum quantity has not been reached, the preferred channel is used to transmit the processed packet. Else, the processed packet is transmitted on the previous preferred channel.

Thus, for the UDP-to-TCP mode:
if the quantity (Stcp) of data already transmitted on the TCP channel, since the last execution of the step 3668 (resetting Stcp at zero), for the type of packet processed is greater than the maximum authorized value (Wtcp-max) (yes response to the test of the step 381), the processed packet will be transmitted on the UDP channel (the operation passes to the steps 386 and 387, after the step 385), even if the preferred channel were to be the TCP channel. In the step 385, the quantity (Sudp) of data already transmitted on the UDP channel since the last execution of the step 3658 (resetting of Sudp), for the type of packet processed, is increased by the size of the packet processed (Sudp=Sudp+packet size);

if the quantity (Stcp) of data already transmitted on the TCP channel from the last execution of the step 3668 (resetting of Stcp), for the type of packet processed is smaller than or equal to the maximum authorized value (Wtcp-max) (negative response to the test at the step 381), the processed packet will be transmitted on the TCP channel (the operation passes to the steps 383 and 384, after the step 382 has been performed). In the step 382, the quantity (Stcp) of data already transmitted on the TCP channel for the processed packet is increased by the size of the processed packet (Stcp=Stcp+Packet-Size).

For the TCP-to-UDP mode:
if the quantity (Sudp) of data already transmitted on the UDP channel since the last execution of the step 3658 (resetting of Sudp), for the type of packet processed is lower than or equal to the maximum authorized value (Wudp-max) (yes response to the test of the step 381), the processed packet will be transmitted on the UDP channel (the operation passes to the steps 386 and 387 after the step 385 has been performed) even if the preferred channel were to be the TCP channel.

if the quantity (Sudp) of data already transmitted on the UDP channel since the last execution of the step 3658 (resetting of Sudp), for the type of packet processed is greater than the maximum authorized value (Wudp-max) (negative response to the test of the step 381), the processed packet will be transmitted on the TCP channel (the operation passes to the steps 383 and 384 after the step 32 has been performed).

Figure 9:
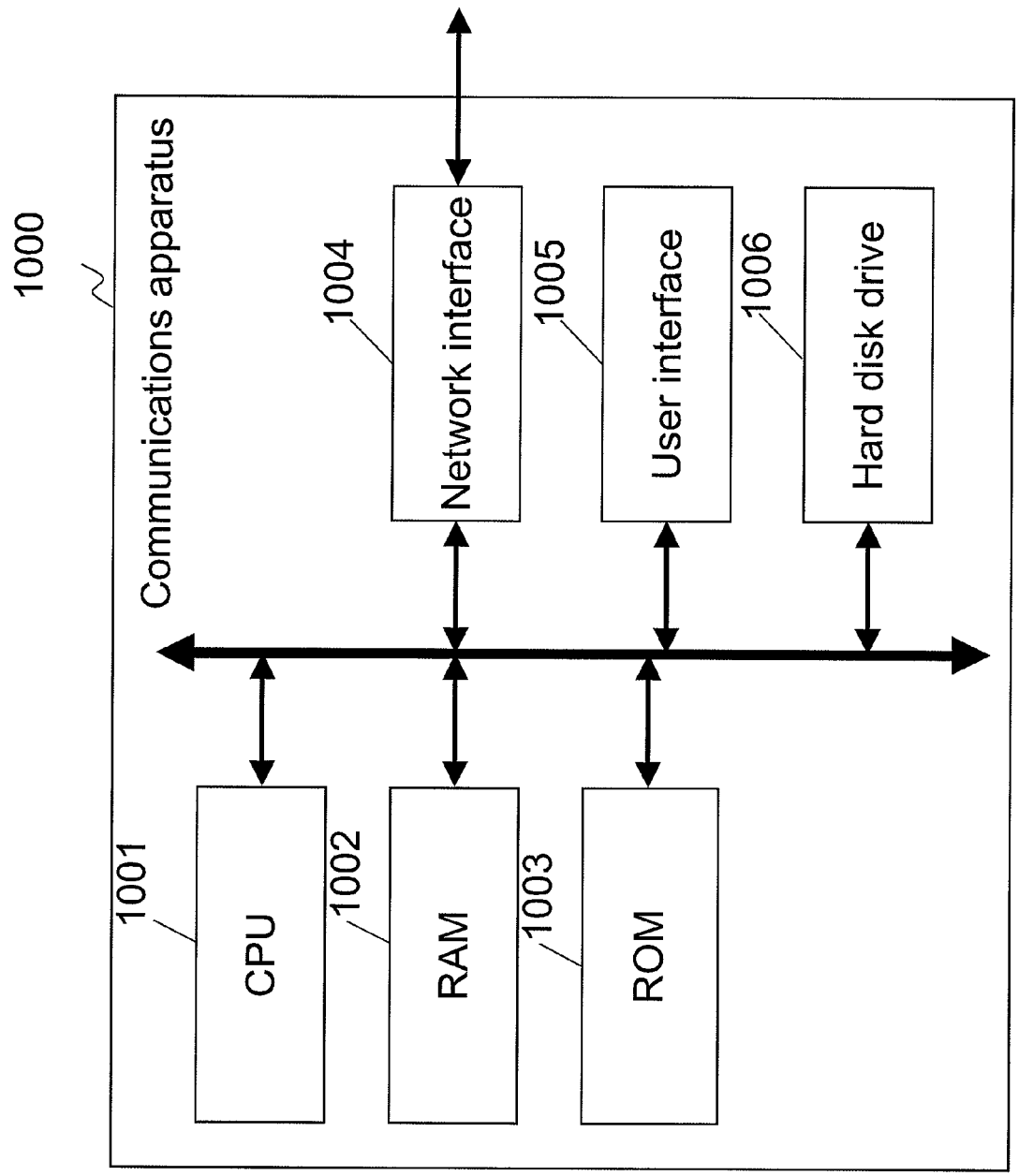
FIG. 9 shows the structure of a communications apparatus (tunnel end-point) according to a particular embodiment of the invention.

FIG. 9 illustrates a schematic configuration of a communications apparatus 1000 (tunnel end-point 101 or 102 of FIG. 1*a*) adapted to implementing the technique of the invention. It comprises a RAM 1002 which works as a main memory, a working zone etc, of the central processing unit (CPU) 1001. Its memory capacity may be extended by an optional RAM (not shown) connected to an extension port. The central processing unit 1001 is capable, when the communications apparatus is powered on, of executing instructions from the ROM of the program 1003. After power-on, the central processing unit 1001 is capable of executing instructions from the main memory 1002 related to a software application after the instructions have been loaded from the program ROM 1003 or the hard disk drive (HDD) 1006, for example. Such a software application, although executed by the central processing unit 1001, prompts the performance of all or part of the steps of the flowcharts illustrated in FIGS. 2*b*, 2*c*, 3, 4, 5, 6, 7*a*, 8*a*, 8*b* and 8*c*.

What is claimed is:

1. A method for the transmission of data packets in a tunnel interconnecting two sub-networks in order to form a total communications network, said tunnel being implemented between two tunnel end-points, each of said two sub-networks comprising a distinct tunnel end-point among said two tunnel end-points, said tunnel implementing at least two transmission channels, said method being implemented by one of said two tunnel end-points, known as a tunnel incoming end-point,
wherein the method comprises the following steps for each data packet:
a) reception of a data packet coming from a source device belonging to a same sub-network as the tunnel incoming end-point;
b) selection of an effective channel from among the transmission channels, as a function of a protocol associated with the payload data contained in the received packet, and of a piece of information on quality of transport linked to current conditions of transmission on said transmission channels, said piece of information depending on said protocol associated with the payload data contained in the received packet;
c) encapsulation of the received packet, according to a transport protocol associated with the effective channel, used to obtain a packet to be sent; and
d) transmission of the packet to be sent in the tunnel on the effective channel selected.

2. A method according to claim 1, wherein said piece of information on quality of transport linked to current conditions of transmission belongs to the group comprising:
information on congestion of said transmission channels;
information on a packet error rate for said transmission channels; and
information on a retransmission rate of said transmission channels.

3. A method according to claim 1, wherein said step b) of selection of an effective channel comprises the following steps:
i) determining a type of packet associated with the received packet, each type of packet being defined by a distinct protocol associated with the payload data contained in the packets possessing said type of packet;
ii) determining a preferred channel, called a preceding preferred channel, which enables for a previously transmitted packet, transmitted by the tunnel incoming end-point and being of a type identical to the received packet, an optimum transmission as a function of a piece of information on quality of transport linked to transmission conditions on said transmission channels obtained for said previously transmitted packet;
iii) obtaining said piece of information on quality of transport linked to current conditions of transmission on said transmission channels;
iv) selecting a channel, called a new preferred channel, enabling optimum transmission of the received packet as a function of the type of packet associated with the received packet and of said piece of information on quality of transport linked to current conditions of transmission on said transmission channels; and
v) selecting said effective channel as a function of the preceding preferred channel, the new preferred channel and the type of packet associated with the received packet.

4. A method according to claim 3, wherein if, for the type of data associated with the received packet, the preceding preferred channel is different from the new preferred channel, then the selection of the effective channel results from a mechanism of smooth switching from said preceding preferred channel to said new preferred channel for the type of packet associated with the received packet.

5. A method according to claim 1, wherein said step of selection of an effective channel is done from among the following two channels:
- a first channel, called a Transmission Control Protocol (TCP) channel, whose associated transport protocol is the TCP protocol; and
- a second channel, called a User Datagram Protocol (UDP) channel, whose associated transport protocol is the UDP protocol.

6. A method according to claim 5, wherein, should the received packet be a UDP type packet, and if said piece of information on quality of transport linked to current conditions of transmission indicates a congestion of said transmission channels, then the new preferred channel for the received packet is the UDP channel and, if said piece of information on quality of transport linked to current conditions of transmission does not indicate any congestion of said transmission channels, then the new preferred channel for the received packet is the TCP channel.

7. A method according to claim 5, wherein, should the received packet be a UDP type packet, and if said piece of information on quality of transport linked to current conditions of transmission indicates a congestion of said transmission channels, then the new preferred channel of the received packet is the UDP channel, and if said piece of information on quality of transport linked to current conditions of transmission indicates a packet error rate below a determined threshold, then the new preferred channel for the received packet is the TCP channel and if said piece of information on quality of transport linked to current conditions of transmission indicates a packet error rate of said transmission channels greater than or equal to said determined threshold, then the new preferred channel for the received packet is the UDP channel.

8. A method according to claim 5 wherein, should the received packet be a TCP type packet, if said piece of information on quality of transport linked to current transmission conditions indicate a retransmission rate of said transmission channels above a determined threshold, then the new preferred channel for the received packet is the UDP channel and if said piece of information on quality of transport linked to current conditions of transmission indicate a transmission rate of said transmission channels lower than or equal to said determined threshold, then the new preferred channel for the received packet is the TCP channel.

9. A non-transitory computer-readable storage medium, storing a computer program comprising a set of instructions executable by a computer in order to implement a method for the transmission of data packets in a tunnel interconnecting two sub-networks in order to form a total communications network, said tunnel being implemented between two tunnel end-points, each of said two sub-networks comprising a distinct tunnel end-point among said two tunnel end-points, said tunnel implementing at least two transmission channels, said method being implemented by one of said two tunnel end-points, known as a tunnel incoming end-point, wherein the method comprises the following steps for each data packet:
- a) reception of a data packet coming from a source device belonging to a same sub-network as the tunnel incoming end-point;
- b) selection of an effective channel from among the transmission channels, as a function of a protocol associated with the payload data contained in the received packet, and of a piece of information on quality of transport linked to current conditions of transmission in said transmission channels, said piece of information depending on said protocol associated with the payload data contained in the received packet;
- c) encapsulation of the received packet, according to a transport protocol associated with the effective channel, used to obtain a packet to be sent; and
- d) transmission of the packet to be sent in the tunnel on the effective channel selected.

10. A tunnel incoming end-point enabling the transmission of data packets in a tunnel interconnecting two sub-networks in order to form a total communications network, said tunnel being implemented between said tunnel incoming end-point and a tunnel outgoing end-point, each of said two sub-networks comprising a distinct tunnel end-point among the tunnel end-points, said tunnel implementing at least two transmission channels, wherein it comprises:
- means of reception of a data packet coming from a source device belonging to a same sub-network as the tunnel incoming end-point;
- means of selection of an effective channel from among the transmission channels, as a function of a protocol associated with the payload data contained in the received packet, and of a piece of information on quality of transport linked to current transmission conditions in said transmission channels, said piece of information depending on said protocol associated with the payload data contained in the received packet;
- means of encapsulation of the received packet, according to a transport protocol associated with the effective channel, used to obtain a packet to be sent; and
- means of transmission of the packet to be sent in the tunnel on the effective channel selected.

11. A tunnel incoming end-point according to claim 10, wherein said piece of information on quality of transport linked to current conditions of transmission belongs to the group comprising:
- information on congestion of said transmission channels;
- information or a packet error rate for said transmission channels; and
- information on a retransmission rate of said transmission channels.

12. A tunnel incoming end-point according to claim 10, wherein said means of selection of an effective channel comprise:
- means of determining a type of packet associated with the received packet, each type of packet being defined by a distinct protocol associated with the payload data contained in the packets possessing said type of packet;
- means of determining a preferred channel, called a preceding preferred channel, which enables for a previously transmitted packet, transmitted by the tunnel incoming end-point and being of a type identical to the received packet, an optimum transmission as a function of a piece of information on quality of transport linked to transmission conditions on said transmission channels obtained for said previously transmitted packet;
- means of obtaining said piece of information on quality of transport linked to current conditions of transmission on said transmission channels;
- means of selecting a channel, called a new preferred channel, enabling optimum transmission of the received packet as a function of the type of packet associated with the received packet and of said piece of information on quality of transport linked to current conditions of transmission on said transmission channels; and means of selection of said effective channel as a function of the preceding preferred channel, the new preferred channel and the type of packet associated with the received packet.

13. A tunnel incoming end-point according to claim 12, wherein said means of selection of the effective channel comprise:
   means of implementing a mechanism of smooth switching from said preceding preferred channel to said new preferred channel for the type of packet associated with the received packet; and
   means of activation of said means of implementing a smooth switching mechanism if, for the type of packet associated with the received packet, the previous preferred channel is different from the new preferred channel.

14. A tunnel incoming end-point according to claim 10, wherein said transmission channels among which the selection of the effective channel is made the following two channels:
   a first channel, called a Transmission Control Protocol (TCP) channel, whose associated transport protocol is the TCP protocol; and
   a second channel, called a User Datagram Protocol (UDP) channel, whose associated transport protocol is the UDP protocol.

15. A tunnel incoming end-point according to the claim 14, wherein said means of selection of the effective channel are such that, should the received packet be a UDP type packet, if said piece of information on quality of transport linked to current conditions of transmission indicates a congestion of said transmission channels, then the new preferred channel for the received packet is the UDP channel and, if said piece of information on quality of transport linked to current conditions of transmission does not indicate any congestion of said transmission channels, then the new preferred channel for the received packet is the TCP channel.

16. A tunnel incoming end-point according to the claim 14, wherein said means of selection of the effective channel are such that, should the received packet be a UDP type packet, and if said piece of information on quality of transport linked to current conditions of transmission indicates a congestion of said transmission channels, then the new preferred channel of the received packet is the UDP channel, and if said piece of information on quality of transport linked to current conditions of transmission indicates a packet error rate below a determined threshold, then the new preferred channel for the received packet is the TCP channel and if said piece of information on quality of transport linked to current conditions of transmission indicates a packet error rate of said transmission channels greater than or equal to said determined threshold, then the new preferred channel for the received packet is the UDP channel.

17. A tunnel incoming end-point according to the claim 14, wherein said means of selection of the effective channel are such that, should the received packet be a TCP type packet, and if said piece of information on quality of transport linked to current transmission conditions indicate a retransmission rate of transmission channels above a determined threshold, then the new preferred channel for said the received packet is the UDP channel and if said piece of information on quality of transport linked to current conditions of transmission indicate a transmission rate of said transmission channels lower than or equal to said determined threshold, then the new preferred channel for the received packet is the TCP channel.

* * * * *